April 14, 1959 D. H. REEVES 2,881,977

KEY OPERATED PORTABLE CALCULATING MACHINE

Filed Nov. 5, 1952 8 Sheets-Sheet 1

INVENTOR.
Donald H. Reeves

INVENTOR.
Donald H. Reeves

April 14, 1959 D. H. REEVES 2,881,977

KEY OPERATED PORTABLE CALCULATING MACHINE

Filed Nov. 5, 1952 8 Sheets-Sheet 3

INVENTOR.
Donald H. Reeves

INVENTOR.
Donald H Reeves

INVENTOR.

Donald H Reeves

April 14, 1959 D. H. REEVES 2,881,977

KEY OPERATED PORTABLE CALCULATING MACHINE

Filed Nov. 5, 1952 8 Sheets-Sheet 6

INVENTOR.
Donald H Reeves

INVENTOR.
Donald H. Reeves

April 14, 1959
D. H. REEVES
2,881,977
KEY OPERATED PORTABLE CALCULATING MACHINE
Filed Nov. 5, 1952
8 Sheets-Sheet 8
FIG. 27
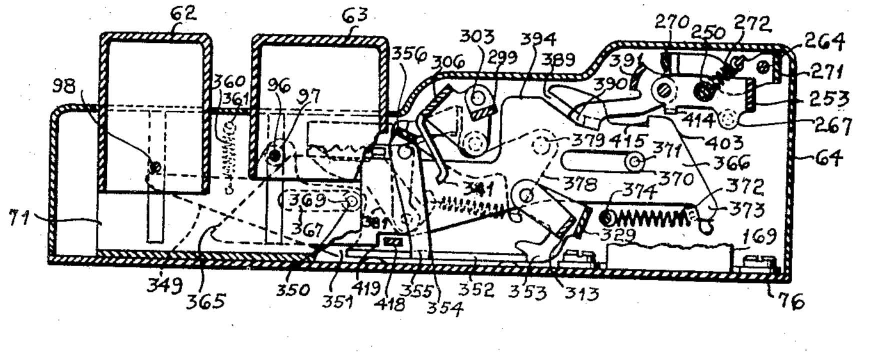
FIG. 28
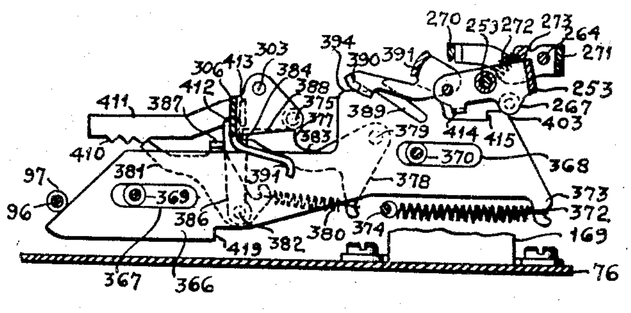
FIG. 30
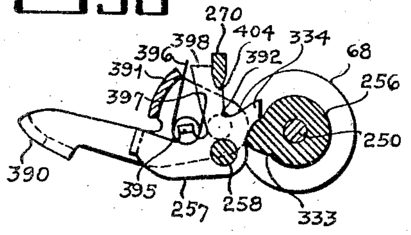
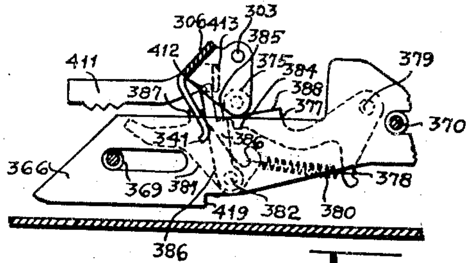
FIG. 29
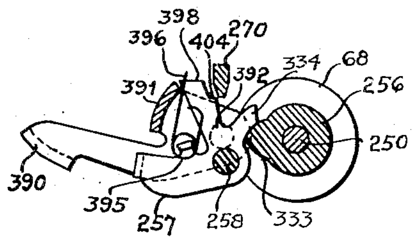
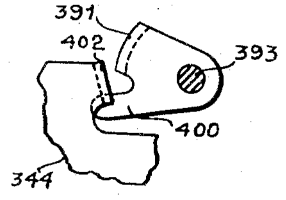
FIG. 31
FIG. 32
INVENTOR.
Donald K. Reeves

United States Patent Office 2,881,977

Patented Apr. 14, 1959

2,881,977

KEY OPERATED PORTABLE CALCULATING MACHINE

Donald H. Reeves, Muskegon, Mich.

Application November 5, 1952, Serial No. 318,813

63 Claims. (Cl. 235—82)

This invention relates to a computing machine and more particularly to a machine for the purpose of adding and subtracting.

Adding and subtracting machines now in common use are of such size and weight that they cannot conveniently be manually transported from one place to another nor can they generally be stored in a desk drawer or other such space of limited capacity, but must generally be kept on top of a desk or table when not in use. Present machines are also of such cost as to make them impractical for a large number of people who have limited use therefor. Substitutes for these large, heavy and costly machines have been designed and sold, but these machines generally are of such a nature as to be slow in operation and in other ways unsatisfactory. Key operated machines now in common use cost considerably more if they are made to both add and subtract than if they only add.

An object of this invention is to improve machines which add and subtract. More specifically, an object of this invention is to provide a machine which will both add and subtract of such size and weight that it can readily be transported from place to place in a coat pocket, brief case or otherwise without inconvenience to the person carrying it.

Another object of this invention is to provide an adding machine of small size and light weight which is completely key operated so that it will be fast in operation and so it will not tend to move when operated, as would so light a machine if operated by cranks, levers or other means than vertically depressible keys.

Another object of this invention is to provide a key operated adding machine of such construction that its cost will be considerably less than the cost of those now in common use.

Another object of this invention is to provide a key operated adding machine of low cost so designed that subtracting can also be provided without greatly increasing the cost.

Another object of this invention is to provide a ten-key type of adding and subtracting machine in small size and light weight.

Another object of this invention is to provide an adding and subtracting machine which is completely key operated and so designed that the pressures required to depress the various keys are light and satisfactory, the work required being distributed among the various keys in such a manner as to best accomplished this result.

Another object of this invention is to provide an adding and subtracting machine of such small size that it readily can be stored in a desk drawer or other small space when not in use.

Another object of this invention is to provide an adding and subtracting machine of such small size and operating characteristics that it can be kept at all times in a desk drawer and can be operated without the necessity of removing it from the drawer.

Another object of this invention is to provide an adding and subtracting machine of low cost wherein the operator can check the amount entered for adding or subtracting and can correct the amount if incorrect.

Another object of this invention is to provide an adding and subtracting machine of low cost which includes provisions to prevent malfunctioning of the machine or improper operation by the operator.

Other objects and advantages reside in the construction of parts, the combination thereof and the mode of operation, as will become more apparent from the following description.

The adding and subtracting machine herein described is of the "ten-key" type and is operated solely by the depressing of keys in a direction essentially perpendicular to the plane of support of the machine without the use of any outside power other than that furnished by the operator when depressing the keys. It is small enough and light enough so that it can easily be carried in a coat pocket or a brief case and can be kept in a drawer of a desk, even inculding a drawer as small as the average "lap drawer." It is of such construction as to lend itself readily to economical manufacture. It is provided with numerous safeguards to prevent malfunctioning or, as far as is possible with any machine, incorrect manipulation by the operator. It is provided with two sets of numeral wheels, one of which gives the operator a means of checking the amount which has been entered before adding or subtracting, while the second set accumulates the total. It is so designed that an incorrect entry can be eliminated without affecting the total. Its design is such that the function of subtraction adds very little to the cost of the machine over the cost if it added only.

*General description of machine*

Having thus described the broad objects of my invention, I will now describe one form of such mechanism which will accomplish the desired addition and subtraction.

In this disclosure of my invention, I have elected to describe a machine which can add or subtract on each operation a number with as many as six digits, or 999,999 (or $9,999.99), while the totalizer has a capacity of seven digits, or 9,999,999 (or $99,999.99). It is to be understood that my invention is not limited to this number of digits in either the amount to be added or subtracted or in the capacity of the totalizer, but that either of these capacities can be increased or decreased as may be desired.

Referring to the drawings, Figure 1 is a top view of the preferred embodiment of the elected machine, showing the arrangement of the keyboard and the positions of the "Item" and "Total" indicators.

Figure 27 is a vertical sectional view approximately along the line 27—27 as shown in Figure 2 and shows the parts used in connection with the "Clear" key and the "Error" key.

Figure 28 shows the positions of the parts used in connection with the "Clear" key when the "Clear" key is depressed about 80% of its total travel.

Figure 29 shows certain of the parts shown in Figure 28, when the "Clear" key is fully depressed.

Figure 30 shows a totalizer wheel and associated parts during one step of the clearing operation.

Figure 31 shows the same parts as are shown in Figure 30 during another step in the clearing operation.

Figure 32 shows the right end of the transfer pawl stop and its relation to the totalizer shifting member.

*External parts*

Figure 2:
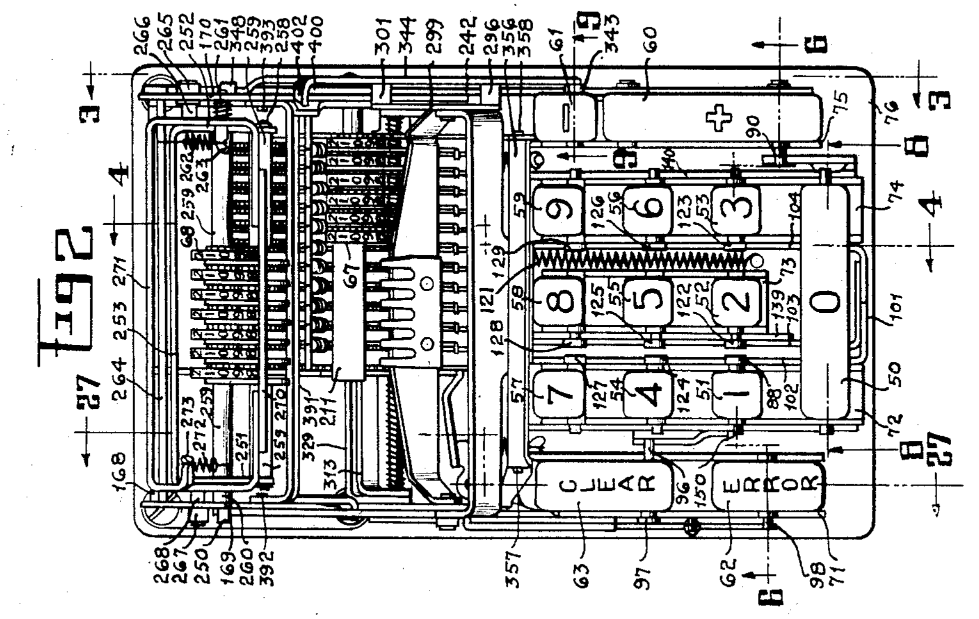
Figure 2 is a top view of the same machine with the cover removed.

In the drawings, reference characters 50, 51, 52, 53, 54, 55, 56, 57, 58 and 59 designate ten amount keys by means of which digitary amounts from 0 to 9 respectively are entered into the machine for either adding or subtracting. 60 is an adding, or "+" key, 61 is a subtracting, or "—" key, 62 is an "Error" key and 63 is a "Clear" key.

A case 64 covers the mechanism, having openings in its top through which the various keys project and also two openings 65 and 66 which expose respectively numeral bearing wheels 67 which show the amount entered by the amount keys and numeral bearing or totalizer wheels 68 which show the amount that has been accumulated on the totalizer.

*Operating the machine*

Figure 1:
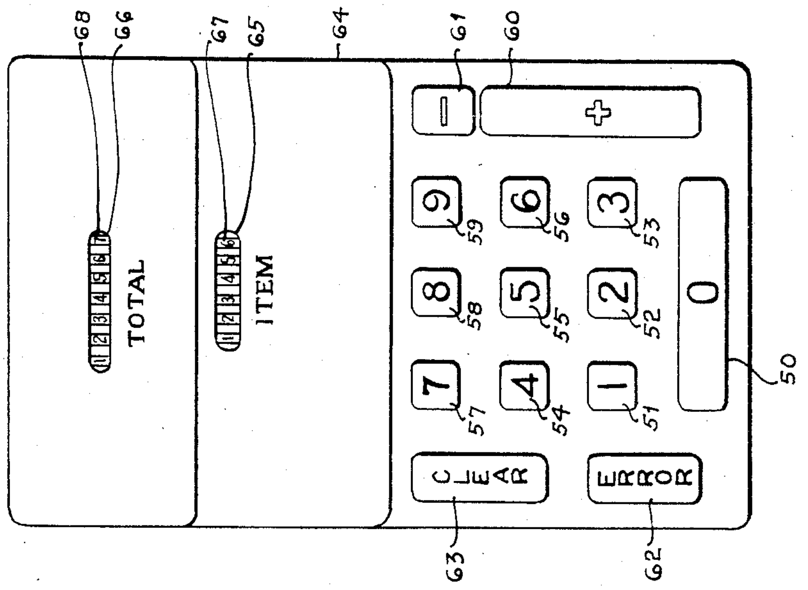

If the amount 123,456 (of $1,234.56) is to be entered in the machine for adding or subtracting, the operator does so by successively depressing to their full extent and then releasing the amount keys 51, 52, 53, 54, 55 and 56. When the first amount key, in this case key 51, has been depressed and released, the amount "1" will show in the opening 65. After the second amount key has been depressed and released, in this case key 52, the amount "12" will show in the opening 65. In like manner, as each amount key is depressed and released, that number which that key represents will appear in the opening 65 so that when keys 51, 52, 53, 54, 55 and 56 have been successively depressed and released, the amount 123,456 (or $1,234.56) will appear in this opening as shown in Figure 1. Figure 1 shows an amount of 1,234,567 (or $12,345.67) on the wheels 68, indicating that this amount has been accumulated in the totalizer up to this time.

After the amount to be added or subtracted has been entered in the machine as described above, any one of three operations can follow. If the amount entered is to be added, the adding or "+" key 60 is depressed. This causes the amount that has been entered to be added to the amount already accumulated in the totalizer, so that the wheels 68 will now show an amount of 1,358,023, at the same time eliminating the amount shown in opening 65 so that this is now blank, and leaving the mechanism ready for the next operation. If the amount entered is to be subtracted, the subtracting or "—" key 61 is depressed. The adding key 60 will lower when the subtracting key 61 is depressed, so it is permissible when it is desired to subtract to depress both keys simultaneously. This causes the amount that has been entered to be subtracted from the amount already accumulated in the totalizer, so that the wheels 68 will show 1,111,111 if the totalizer wheels previously showed 1,234,567. At the same time the amount showing in the opening 65 is eliminated so that it is now blank and the mechanism is left ready for the next operation. If the amount entered is found to be incorrect so that the operator does not wish to either add or subtract it on the totalizer, the "Error" key 62 is depressed. This causes the amount that has been entered to be eliminated from the opening 65, without in any way affecting the totalizer, and leaves the mechanism ready for the next operation.

After all the desired amounts have been entered and either added or subtracted as described above, the totalizer wheels 68 will show the final result. To return the totalizer wheels 68 to zero, the operator depresses the "Clear" key 63, which leaves the machine ready to start the next problem in addition or subtraction.

*Principles used in adding and subtracting*

Adding is accomplished in this machine by the following steps:

(1) A rack is positioned by means of one of the amount keys, being moved the distance of one gear tooth if the "1" key is pressed, two if the "2" key is pressed, etc. The rack is held by a latch in the position to which it has been moved, against the action of a spring which tends to return it to its original position.

(2) The positioned rack is shifted to the left and a second rack is positioned in the same way as was the first one, provided the number to be added has more than one digit. This is repeated until as many racks have been positioned as there are digits in the number to be added.

In case the "0" key is depressed, the rack then in position for moving is not moved but is left in its original position and is shifted to the left.

(3) Idler gears which are constantly in mesh with gears on the indicating wheels of the totalizer are caused to mesh with the racks described above, after which they are released from a locking bar which prevents these gears and the indicating wheels from turning when they are not in mesh with the racks.

(4) The latches which hold the racks in the positions to which they have been moved by the amount keys are released and the racks return to their original positions under the influence of their springs.

(5) If any totalizer indicating wheel has passed from 9 to 0, a detent on the rack of the next higher order is released, allowing that rack to move one additional space.

(6) After all racks have returned to their original positions or one space beyond if a transfer has been made as described in (5), the totalizer idler gears are locked in position and then disengaged from the racks.

(7) Any racks that have moved an extra space to effect a transfer are returned to their original positions.

(8) All racks are shifted back to the right to their original positions. The mechanism is now ready for another number to be entered for adding or subtracting.

Subtracting is accomplished in this machine by the following steps:

(1) A rack is positioned by one of the amount keys exactly the same as when adding, as described above. This rack in turn revolves a gear situated beside the rack, moving the gear one tooth space if the rack is moved one tooth space, two tooth spaces if the rack is moved two tooth spaces, etc. Each of the racks has such a gear moved by the rack.

(2) Same as for adding.

(3) The entire totalizer with its idler gears is shifted against the action of a spring so that the idler gears are over the gears described in (1) instead of being over the racks.

(4) The totalizer idler gears are caused to mesh with the gears described in (1), after which they are released from the locking bar.

(5) The latches which hold the racks in the positions to which they have been moved by the amount keys are released and the racks return to their original positions under the influence of their springs, at the same time turning the gears described in (1) to their original positions.

(6) If a totalizer indicating wheel has passed from 0 to 9, the stop on the rack of the next higher order is released, allowing the rack and the gear described in (1) to move one extra space, thereby moving the wheel of the next higher order one extra space.

(7) After all racks have returned to their original positions or one space beyond if a transfer has been made as described in (6), the totalizer idler gears are locked in position and then disengaged from the gears described in (1).

(8) The same as (7) in adding.

(9) All racks are shifted back to the right to their original positions and the totalizer is allowed to return under the action of its spring to its original position so that the idler gears are over the racks.

A comparison of the steps used in adding with those used in subtracting will show that they are identical excepting that the totalizer idler gears are actuated by the rack driven gears instead of by the racks themselves, thereby rotating the totalizer wheels in the opposite direction, and that this difference is accomplished by simply shifting the totalizer so that its idler gears are over the rack driven gears instead of being over the racks. Since the rack driven gears are always in mesh with the racks and are therefore always moved when the racks are moved, there is no difference in the operation while the racks are being positioned by means of the amount keys since the shifting of the totalizer, in case subtracting is desired, takes place after this.

If, due to an error in entering the amount or for any other reason, the operator does not wish an entered amount to be added to or subtracted from the amount already in the totalizer, this entered amount can be eliminated without affecting the totalizer by depressing the "Error" key, which returns any amount racks that have been moved, to their original positions and shifts all of the racks to the right until they are in their original positions. The machine is now in the same condition as it was in before the last amount was entered by means of the amount keys.

Having thus described the principles used in adding and subtracting with this machine, I will now describe the mechanism and how these principles are applied.

*The Keyboard Mechanism*

Figure 6:
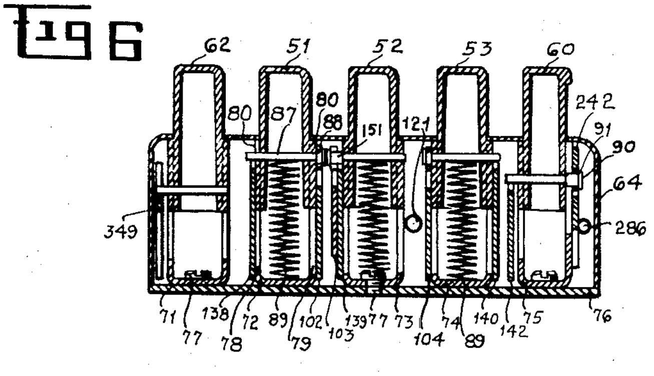
Figure 6 is a vertical sectional view taken approximately along line 6—6 as shown in Figure 2, showing details of construction of some of the keys and of certain adjacent parts.
Figure 7:
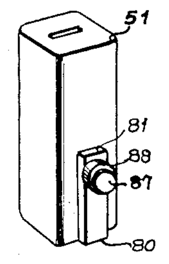
Figure 7 is a perspective view of one of the amount keys, showing some of the details of its construction.
Figure 8:
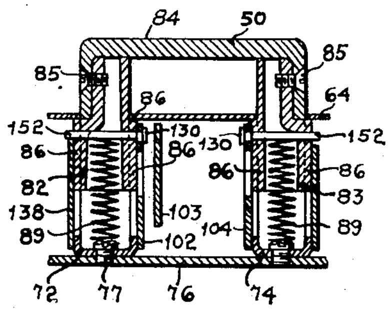
Figure 8 is a vertical sectional view taken along line 8—8 as shown in Figure 2 and shows the construction of the "0" key.

Figure 6, which is a vertical sectional view through the amount keys 51, 52 and 53 and through the "+" key 60 and the "Error" key 62, best shows how these keys are supported and guided. There are five U-shaped support members 71, 72, 73, 74 and 75 attached to a base plate 76 by suitable means such as screws 77. These support members 71, 72, 73, 74 and 75 have aligned slots in their vertical portions, such as slots 78 and 79 in the support member 72, as shown in Figure 6. Each key has sections projecting from each side, such as a projection 80 on the amount key 51 as best shown in Figure 7, of such size and shape as to closely guide the movement of the key when these projections are positioned in the slots such as 78 and 79. The top surface of these projections, such as 81, make contact with the under side of the case 64 when the keys are in their uppermost positions and serve to limit the upward movement of the keys. To make possible the application and removal of the desired form of the case 64, the "0" key is made of three pieces, including two upright pieces 82 and 83 and a bridging member 84 secured to the two upright pieces by screws 85. The upright pieces 82 and 83 have guiding projections 86 of similar construction to the projection 80 shown on the amount key 51.

Each of the amount keys 51 to 59 inclusive and each of the upright pieces 82 and 83 of the "0" key has projecting through it and securely fastened thereto a pin, such as pin 87 in key 51. On each of these pins is rotatably mounted a roller, such as the roller 88 on pin 87. Each of the amount keys 51 to 59 inclusive, the uprights 82 and 83 of the "0" key, and the "—" key 61 are hollow and on the interior of each is a spring 89 which tends to keep each key in its uppermost position. The keys other than the amount keys and the "—" key do not have such springs, as they are moved upward by other means which will be described later.

Figure 3:
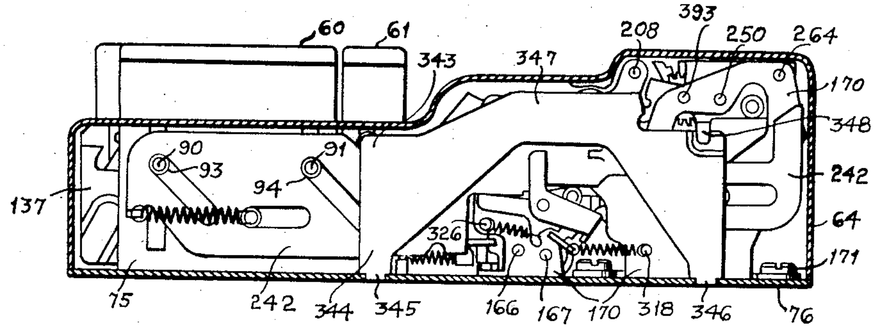
Figure 3 is a vertical sectional view taken approximately along the line 3—3 as shown in Figure 2, showing the right side of the machine.
Figure 21:
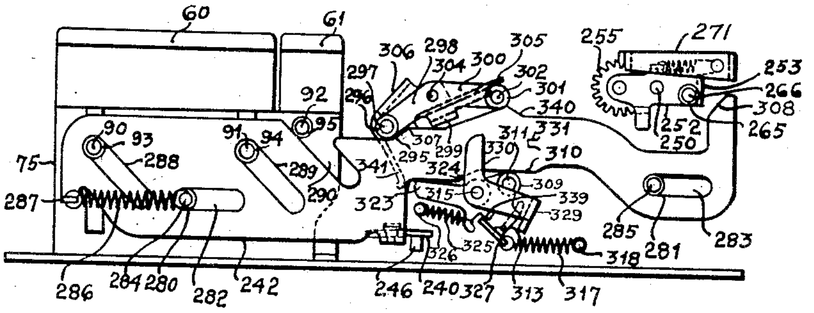
Figure 21 is a side view of the adding cam, the keys which control it and the parts controlled by it when the + key is in its uppermost position.

The "+" key 60 has two pins 90 and 91, best shown in Figures 3 and 21, and the "—" key 61 has one pin 92, best shown in Figure 21, all of which have rollers rotatably mounted thereon, these rollers being respectively 93, 94 and 95. The "Clear" key 63 also has a similar pin 96 on which is rotatably mounted a roller 97. There is also a pin 98 in the "Error" key 62, but there is no roller on this pin.

Figure 5:
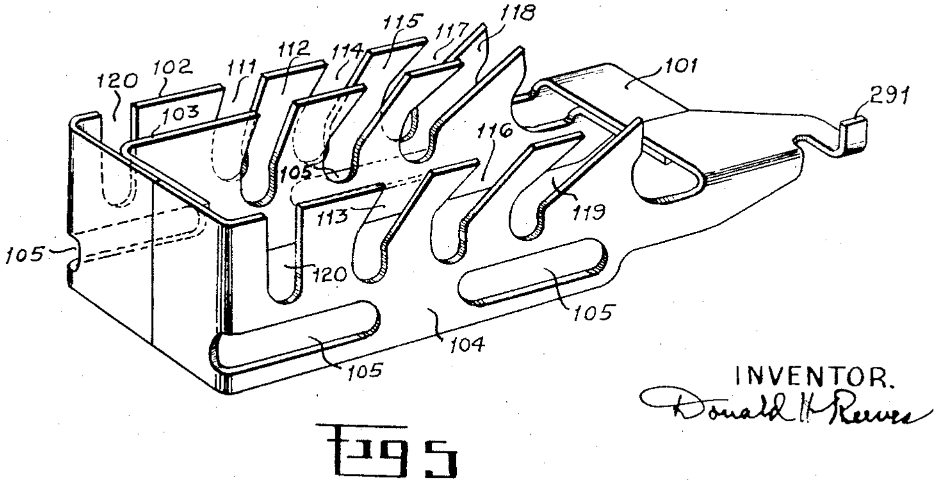
Figure 5 is a perspective view of the rack actuator, somewhat enlarged.
Figure 16:
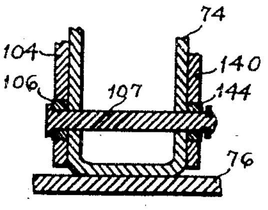
Figure 16 is a vertical cross section along line 16—16, as shown in Figure 13, and shows the method of mounting some of the rollers that carry the rack actuator and the key lockout.

A rack actuator 101, whose general form is best shown in Figure 5, has three parallel, vertically disposed members 102, 103 and 104. The various parts of which this rack actuator 101 is composed are rigidly and permanently secured together, as by welding. The vertically disposed members 102 and 104 each have two horizontal slots 105, in which are located rollers, such as 106, rotatably mounted on pins, such as 107, carried by the key support members 72 and 74 in a manner best shown in Figure 16. The rollers which engage the slots 105 in the vertically disposed member 102 are mounted on pins 109 and 110 which are carried by the key support member 72, while the rollers that engage the slots in the vertically disposed member 104 are mounted on the pins 107 and 108, which are carried by the key support member 74. With this mounting, the rack actuator can move freely forward and backward unless otherwise restrained. It is normally kept forward by a spring 121, shown in Figure 2.

The rack actuator 101 has nine slots 111 to 119 inclusive with various degrees of slope and two slots 120 which are vertical. The roller 88 attached to the "1" key 51 engages slot 111, while roller 122, attached to the "2" key 52, engages slot 112; roller 123, attached to the "3" key 53, engages slot 113; roller 124, attached to the "4" key 54, engages slot 114; roller 125, attached to the "5" key 55, engages slot 115; roller 126, attached to the "6" key 56, engages slot 116; roller 127, attached to the "7" key 57, engages slot 117; roller 128, attached to the "8" key 58, engages slot 118; and roller 129, attached to the "9" key 59, engages slot 119. The two rollers 130, attached to the two upright members 82 and 83 of the "0" key 50, engage the two slots 120. The slot 111 has sufficient slope so that the vertically downward movement of the roller 88 will move the rack actuator 101 to the rear a distance equal to the space of one gear tooth on one of the rack members 131 to 136 to be described later, plus approximately half of such a space, or a total of approximately 1½ tooth spaces. In like manner, the roller 122, when moved vertically downward, will cause the rack actuator to move approximately 2½ tooth spaces, the roller 123 will cause a movement of approximately 3½ tooth spaces, etc., to the point where the roller 129 will cause a movement of approximately 9½ tooth spaces. The reason for these amounts of movement will be apparent as the description proceeds.

Figure 10:
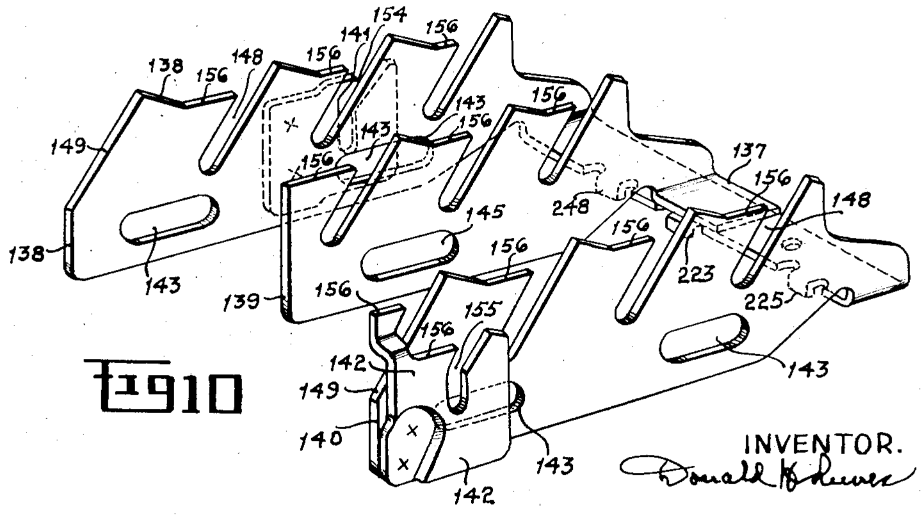
Figure 10 shows a perspective view of the key lockout member, somewhat enlarged.

A multi-purpose key lockout and actuating member 137 is best shown in its general form in Figure 10. This key lockout member has three main vertically disposed portions 138, 139 and 140 and also two smaller portions 141 and 142, all of which are permanently secured together, as by welding. Like the rack actuator 101, the key lockout member 137 has slots 143 which engage rollers 144 which are also mounted on the pins 107, 108, 109 and 110. There is also an additional slot 145 which engages a roller 146 to support the end of the portion 139, the roller 146 being mounted on a pin 147 which is carried by the key support member 73. Thus, like the key actuator 101, the key lockout member can move freely forward and backward unless otherwise restrained. It is normally kept forward by a spring 153, shown in Figure 13.

The key lockout member 137 has nine identical slots 148 and two sloping surfaces 149. Each of the amount keys 51 to 59 inclusive has a portion of its pin, such as 87 of the key 51, which engages one of the slots 148. In the case of pin 87, as well as the pins in keys 53, 54, 56, 57 and 59, the pin extends out of the side of the key opposite to the side on which the roller is located, such as the projection 150 of the pin 87 in key 51, and these pin projections engage the slots 148 in the key lockout member 137 if any one of these keys is depressed. The vertically disposed portion 139 of the key lockout member 137 is on the same side of the amount keys 52, 55 and 58, as is the vertically disposed member 103 of the rack actuator 101, so with each of these three amount keys, a portion of the pin between the roller and the key, such as 151 on the key 52, engages the corresponding slot 148 in the key lockout 137. Two pins 152 also project beyond the upright members 82 and 83 of the "0" key 50 and engage the sloping surfaces 149 on the vertically disposed portions 138 and 140. With this arrangement of pins in the various amount keys and their relation to the slots 148 or sloping surfaces 149, it is apparent that the depressing of any amount key will cause the key lockout member 137 to move rearward and the complete depression of any amount key will cause the same amount of movement of the key lockout member.

The smaller portion 141 of the key lockout member 137 has a slot 154 therein. This engages the end of the pin 96 in the "Clear" key 63 so that the depressing of the "Clear" key will cause the key lockout member 137 to move to the rear, but because of the form of the slot 154, this movement will not be as great as when one of the amount keys is depressed. Likewise, the smaller portion 142 of the key lockout member 137 has a slot 155. The pin 90 in the "+" key 60 engages the slot 155 so that the depressing of the "+" key causes the key lockout member to move to the rear, but because of the form of the slot 155, this movement will not be as great as when one of the amount keys is depressed, but will be the same as when the "Clear" key is depressed.

The key lockout member 137 has several horizontal surfaces 156. When any one of the amount keys 50 to 59 inclusive, or the "+" key 60 or the "Clear" key 63 is depressed, thereby moving the key lockout member to the rear, one of these surfaces 156 will move under the pin of each of the above enumerated keys that has not been depressed, thereby preventing the depressing of any of these other keys so that said other keys are locked out. Since the depressing of the "—" key 61 causes the "+" key 60 also to lower, the locking out of the "+" key also automatically locks out the "—" key. Thus the depressing of any key excepting the "Error" key 62 locks out all the other keys excepting the "Error" key. The "Error" key is omitted from this locking arrangement since it is sometimes necessary to depress the "Error" key when one of the other keys is depressed, as will be described later.

*The rack carriage*

Figure 11:
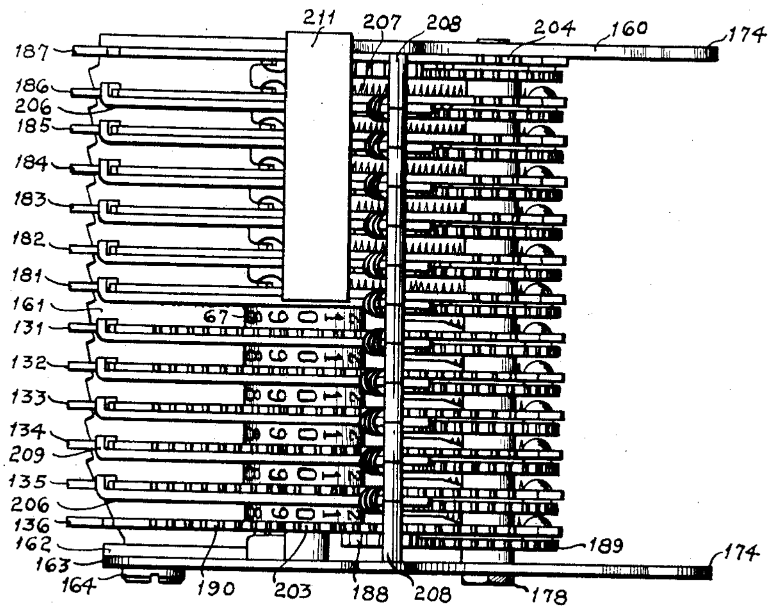
Figure 11 shows a top view of the transversely movable rack carriage.
Figure 12:
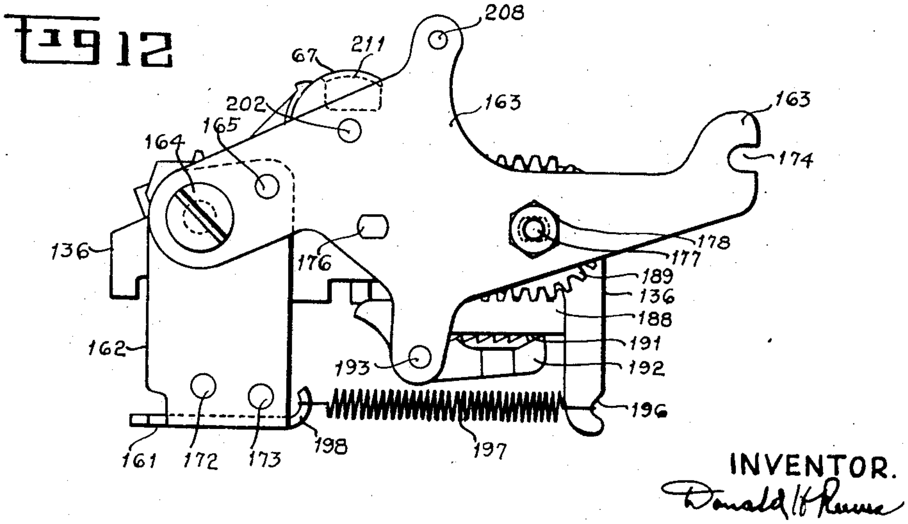
Figure 12 shows a side view of this same rack carriage.

A rack carriage assembly is shown in Figures 11 and 12, including a supporting structure in which 160 is a mounting plate which extends up one side of the rack carriage assembly, across the bottom as shown at 161 and which has a vertically extending portion 162 on the other side of the rack carriage assembly to which a second mounting plate 163 is secured by means of a screw 164 and which is maintained in proper relation to the first mounting plate 160 by means of a projection 165 in the plate 163 which enters a corresponding hole in the vertically extending portion 162 of the mounting plate 160. The entire rack carriage assembly is slidably mounted on rods 166, 167 and 168, these three rods being stationarily held in position by two side plates 169 and 170 which are secured to the base plate 76 by means of screws 171. The rod 166 extends through a hole 172 as shown in Figure 12 and a corresponding hole in the other vertically extending portion of the mounting plate 160. The rod 167 extends through one hole only in the rack carriage mounting plate located at 173. The rod 168 engages two slots 174, one of which is in the mounting plate 163 as shown in Figure 12 and the other in line with it in the mounting plate 160.

Two rack mounting rods 176 and 177 are secured to the mounting plate 160 and project through suitable close fitting openings in the mounting plate 163. The end of the mounting rod 177, which projects through the mounting plate 163, is threaded and a nut 178 maintains the mounting plate 163 in proper relation to the rods 177 and to other parts of the rack carriage assembly.

There are six adding racks (when the machine has a capacity of six digits to be added or subtracted) 131 to 136 inclusive, slidably mounted on the rods 176 and 177, which extend through slots 179 in the adding racks. There are also seven longitudinally moving reset rack members (when the totalizer capacity is seven digits) 181 to 187 inclusive, also slidably mounted on the rods 176 and 177 in the same manner as are the adding racks 131 to 136 inclusive. Each of the adding racks 131 to 136 and each of the reset racks 181 to 187 has attached thereto an auxiliary rack 188 which meshes with a gear 189, this gear being rotatably mounted on the rod 177. Each of the adding racks 131 to 136 inclusive has gear teeth along the greater part of its upper edge as shown at 190, these being of the same size as those on the auxiliary racks 188, and also a notched portion 191 whose notches have the same spacing as the gear teeth on the racks 131 to 136 and on the auxiliary racks 188. Six latches or holding means 192 are mounted on a rod 193 which is secured between the mounting plates 160 and 163. Each of these latches 192 engages the notched portion 191 of one of the adding racks 131 to 136 and has an upwardly extending portion 194 to which is attached one end of a spring 195, the other end of this spring being attached to the mounting rod 176. This spring tends to keep the latch 192 in contact with the notched portion 191 of the adding rack.

Each of the adding racks 131 to 136 inclusive and each of the reset racks 181 to 187 inclusive has a downwardly extending portion 196 to which is attached a spring 197, the other end of this spring being attached to the bottom portion 161 of the mounting plate 160 by means of a hook 198, these several hooks being integral parts of said bottom portion 161. These springs 197 tend to keep their respective racks forward as far as other conditions will permit.

Figure 4:
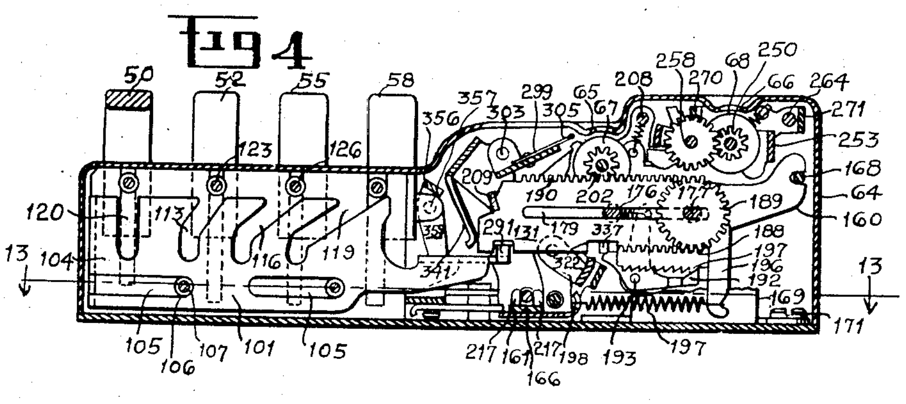
Figure 4 is a vertical sectional view taken approximately long line 4—4 as shown in Figure 2, showing many of the parts involved in adding or subtracting any desired number within the limits of the machine.

There are six "Item" indicating wheels 67 rotatably mounted on a rod 202 which is secured to the mounting plates 160 and 163. Each of these wheels 67 has around its periphery and equally spaced the numerals 0 to 9, as partially shown in Figures 2 and 11. A ten-tooth pinion 203 is an integral part of each of these wheels 67 and is in constant mesh with the gear teeth 190 on one of the adding racks 131 to 136 inclusive, being so assembled that when the adding racks are in their zero positions, as shown in Figure 4, the "0" on each wheel will be uppermost so that it can be seen through the opening 65 in the case 64. When one of the adding racks is moved to the rear a distance equal to one tooth space on its rack, the numeral "1" will be uppermost and will be seen through the opening 65. Since there are ten equally spaced numbers and ten teeth on the pinion 203, each movement of the adding rack by a distance of one tooth space will cause a new numeral to appear in the opening 65.

The reset racks 181 to 187 inclusive serve two purposes. As their name implies, they are used to reset the totalizer to zero in a manner to be described later. They are also used under certain circumstances (excepting reset rack 187) for the transfer, that is, for moving a totalizer wheel an extra space if the wheel of the next lower order has passed from 9 to 0 if adding or from 0 to 9 if subtracting. While the reset racks 181 to 187 inclusive can be of the same form as the adding racks 131 to 136, a slightly simpler form is usable. This is best shown in Figure 19. It will be noted in comparing this reset rack with an adding rack, such as 131 shown in Figure 17, that there are two differences. Instead of a row of gear teeth 190 across nearly the entire top as in the adding rack 131, there are only three teeth 204 on the top edge of the reset racks. The second difference is that a notch 205 that is required in the adding racks is not required in the reset racks.

There are eleven rack detents 206 used in conjunction with the adding racks 131 to 135 inclusive (but not with 136) and with the reset racks 181 to 186 inclusive (but not with 187). These rack detents are rotatably mounted on the rod 202 and are normally rotated counterclockwise by springs 207 until the detent strikes the rod 176 as shown in Figure 18. The upper ends of the springs 207 are attached to a rod 208 which is secured to the two mounting plates 160 and 163. When the rack detents are in this position, transverse hooks 209 thereon engage surfaces 210 on the racks 131 to 135 and 181 to 186, both inclusive, to limit the forward travel of these racks.

The two end racks in the rack carriage assembly, which are the adding rack 136 and the reset rack 187 differ from the other adding and reset racks, in that the slots 179 in these two racks are shortened so that these racks can never move forward beyond the zero positions, the zero positions being those in which the racks are shown in Figures 4 and 19. These two racks are never required to travel the extra space beyond the zero position for transferring and have no detents 206 to hold them in the zero position.

A shield 211, stationarily secured to the mounting plate 160, serves to close the opening 65 in the case 64 when some or all of the "Item" indicating wheels 67 are not under this opening.

*Mechanism for shifting the rack carriage*

After each of the adding racks 131 to 135 inclusive has been positioned by means of the amount keys, the rack carriage assembly must be shifted to the left so that the next adding rack will be in the proper location to be positioned by the amount keys. After the amount entered by the amount keys has been added to or subtracted from the totalizer, the rack carriage assembly must be returned to the right. If the entire force required to return the carriage to the right were provided by the "+" key 60, this would require more pressure to depress the "+" key than is desirable, so I prefer that this force be partially provided by each of the amount keys as it is depressed, thereby dividing the total force required into smaller portions which will not add an undesirable load on any one key. The means for accomplishing this will now be described.

Figure 13:
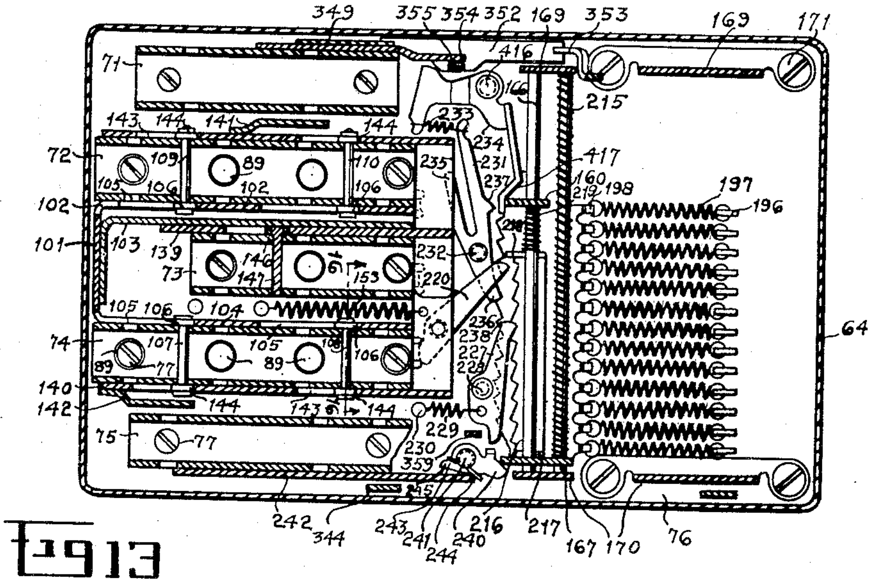
Figure 13 shows a horizontal sectional view of the machine approximately along line 13—13, as shown in Figure 4.

Figure 13, which is a horizontal sectional view showing the lower portion of the machine, shows the rack carriage in its extreme right position, which is its position before an amount to be added or subtracted is entered by means of the amount keys. Surrounding the mounting rod 167 and extending from the stationary side plate 169 to the vertical section 162 of the rack carriage mounting plate 160 is a compression spring 215 which tends to keep the rack carriage to the right and which moves the rack carriage to the right when the rack carriage is free so to move. Resting on the bottom portion 161 of the mounting plate 160 is a notched member 216 having at its two ends vertically extending prongs 217 which engage the front and rear of the mounting rod 166, this mounting rod also limiting the upward movement of the notched member 216. Thus this notched member 216 is prevented from moving upward or to the front or rear but is free to slide longitudinally along the rod 166. Between the vertically extending prongs 218 at the left end of the notched member 216 and the mounting plate 160 is a compression spring 219 which surrounds the mounting rod 166, tending to maintain contact between the prongs 217 at the right end of the notched member 216 and the vertical portion 162 of the mounting plate 160.

An actuating arm 220 is pivotally attached by means of a stud 221 to the key lockout member 137 and is normally rotated clockwise, as viewed from above, by a torsion spring 222 which surrounds the stud 221, has one end engaging a downwardly extending boss 223 which is a part of the key lockout member 137 and the other end engaging a downwardly extending portion 224 of the actuating arm 220. A second downwardly extending boss 225 of the key lockout member 137 limits the clockwise rotation of the actuating arm 220 to the position shown in Figure 13, in which position an end 226 of the actuating arm 220 is free from the notched member 216.

A latch 227 is pivotally attached by means of a stud 228 to the base plate 76 and is rotated clockwise as viewed from above by a spring 229, one end of which is attached to the latch 227 while the other end is held stationary by a stud 230 attached to the base plate 76.

An escapement member 231 is pivotally attached by means of a stud 232 to the base plate 76 and is rotated counter-clockwise, as viewed from above, by a spring 233, one end of which is attached to the escapement member 231 and the other end to a clearing cam lockout member 234 to be described later. The escapement member 231 has a narrow prong 235 which can be bent to adjust the movement of the escapement member and two extensions 236 and 237 which can alternately engage notches 238 in the bottom portion 161 of the mounting plate 160.

Figure 14:
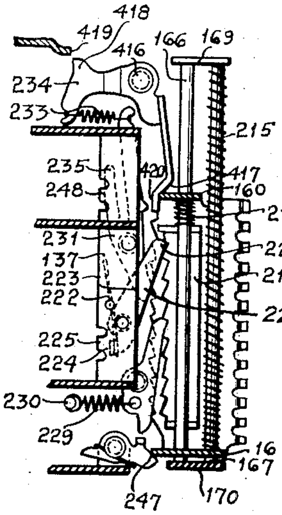
Figure 14 shows some of the parts shown in Figure 13 when one of the amount keys has been depressed part way and shows one stage of the shifting of the rack carriage.
Figure 15:
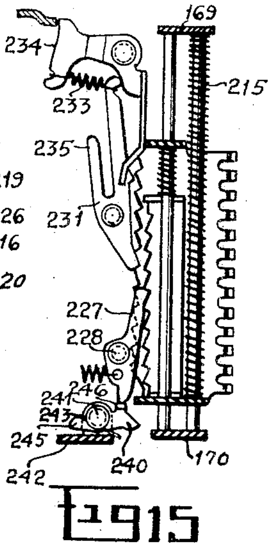
Figure 15 shows approximately the same parts as are shown in Figure 14, after the rack carriage has been shifted one space to the left.

A latch detent 240 is pivotally attached by means of a stud 241 to an adding cam 242 to be described later and is rotated counterclockwise, as viewed from above, by a torsion spring 243, one end of which engages the adding cam at point 244 while the other end engages the detent 240. Counterclockwise rotation of the detent 240 is limited by a heel 245 on the detent 240 engaging the surface of the adding cam 242. A downwardly extending arm 246 on the detent extends into the plane of the latch 227 but is held out of engagement with the latch when the rack carriage is at its extreme right position, as shown in Figure 13, by the contact of the vertical portion 162 of the mounting plate 160 and the edge 247 of the detent 240, as shown in Figures 13 and 14. If the rack carriage is away from its extreme right position, as shown in Figure 15, then the latch 240 will be rotated about the stud 241 by the spring 243 until the downwardly extending arm 246 engages the end of the latch 227, as shown in Figure 15. Other functions of this latch detent will be described in connection with the description of the adding operation.

When any one of the amount keys 50 to 59 is depressed, the key lockout member 137 is moved to the rear, thereby also moving the actuating arm 220 to the rear. Early in this movement, the end 226 of the actuating arm 220 engages one of the notches in the notched member 216. Further movement to the rear of the key lockout member 137 causes the actuating arm 220 to rotate counterclockwise and to cause the notched member 216 to move to the left, this movement to the left being slightly more than sufficient to allow the latch 227 to engage the next notch on the notched member 216 so that when the key lockout member again moves forward, the notched member will remain one notch farther to the left than it was before the rearward movement of the key lockout member 137. Figure 14 shows the key lockout member moved to the rear so that the actuating arm 220 has moved the notched member 216 sufficiently so that the latch 227 has engaged the next notch to the one originally engaged. Further movement to the rear by the key lockout member 137 causes a downwardly extending boss 248 to engage the prong 235 of the escapement member 231 and rotate it clockwise, as viewed from above, so that the extension 237 thereon enters the path of movement of the notches 238, after which the extension 236 is removed from the path of travel of these notches, thereby allowing the rack carriage assembly to be moved to the left by the spring 219 which exerts more pressure than does the spring 215, until one of the notches 238 engages the extension 237 of the escapement member 231. Forward movement of the key lockout member 137 allows the escapement member 231 to rotate counterclockwise under the influence of the spring 233, which causes the extension 236 to enter the path of travel of the notches 238, after which the extension 237 will leave the path of travel of these notches, allowing the rack carriage assembly to be further moved by the spring 219 to the left until one of the notches 238 engages the extension 236 of the escapement member 231. The rack carriage has thus been moved one full space to the left. Movement to the right will be described later in connection with the use of the "+" key 60 and the "Error" key 62.

*The totalizer*

Figure 17:
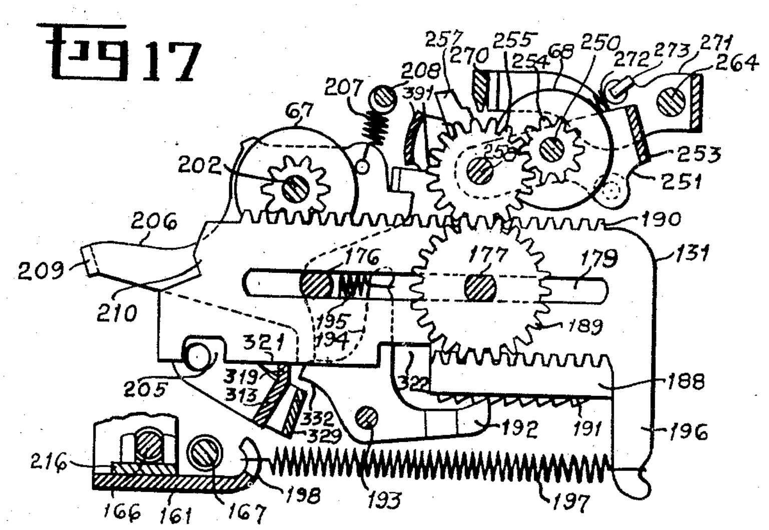
Figure 17 shows one of the adding racks in position to add 6 and the totalizer engaged ready for adding.
Figures 18, 19, 20:
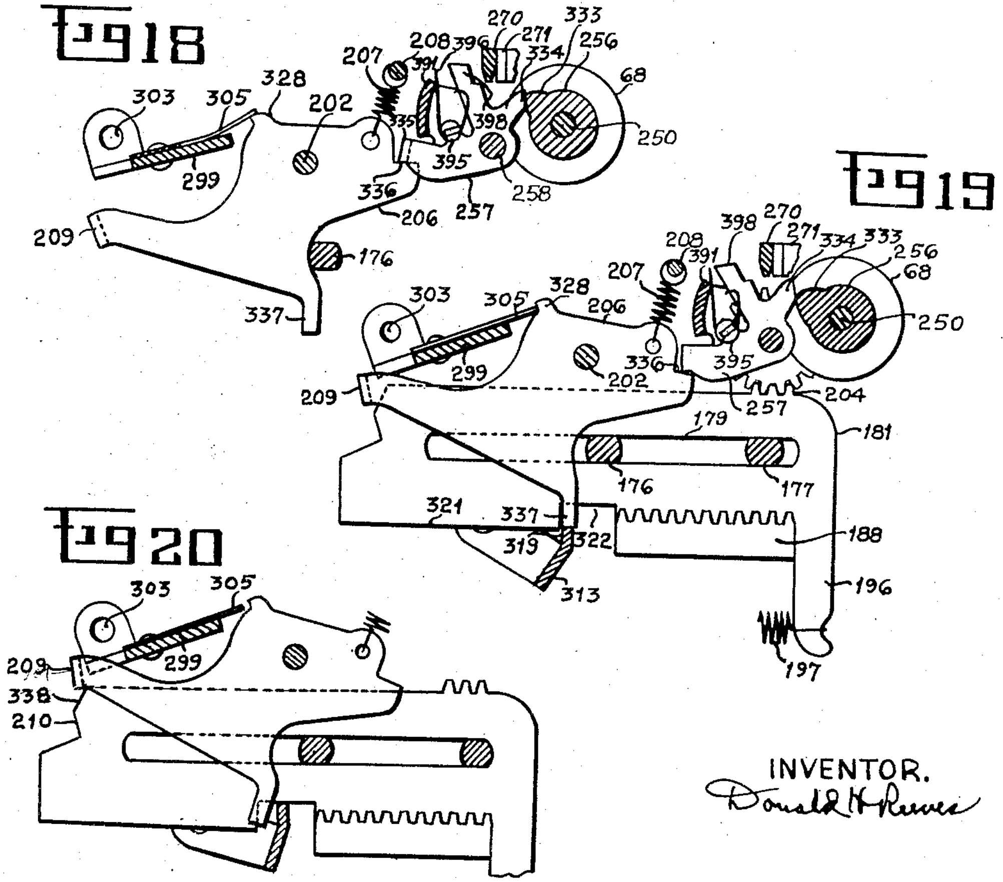
Figure 18 shows the parts used for controlling the transfer and their positions when no transfer is required.
Figure 19 shows the same parts as are shown in Figure 18 with some additional parts and shows the transfer controlling parts in position to cause a transfer.
Figure 20 shows certain of the parts shown in Figure 19 when the rack has moved to effect a transfer.
Figures 23, 24, 25, 26:
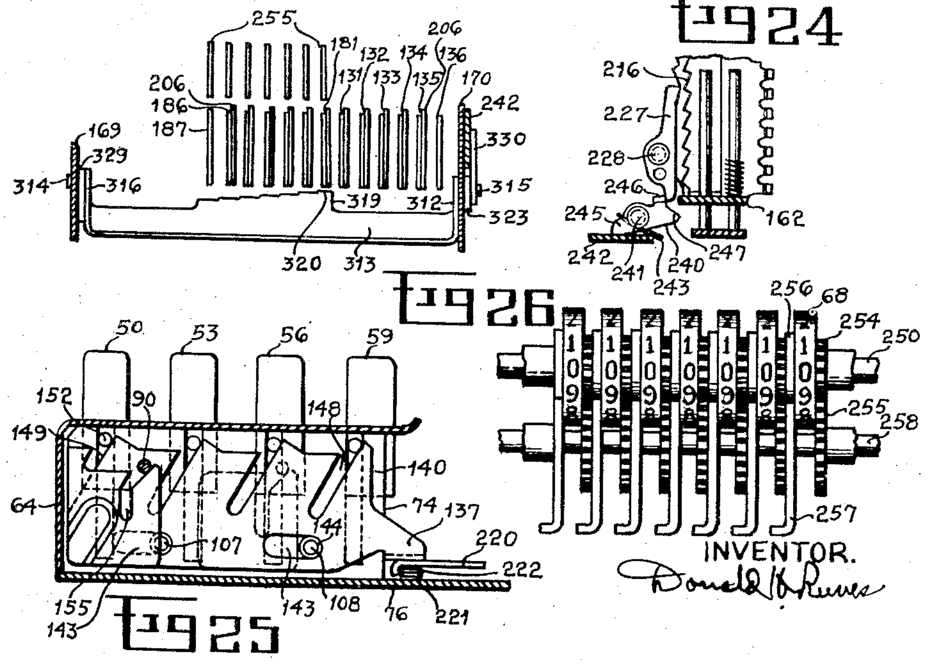
Figure 23 shows the feeler and its position relative to the totalizer idler gears, with the positions of the racks and the rack detents on the rack carriage also shown, without attempting to show the exact forms of the idler gears, racks or rack detents.
Figure 24 shows the rack carriage latch held out of engagement with the rack carriage.
Figure 25 shows a side view of the key lockout member and the positions of the amount keys in relation thereto.
Figure 26 shows a top view of that portion of the totalizer assembly which contains the totalizer wheels, idler gears and transfer pawls.

The totalizer is best shown in the enlarged Figures 17 and 26.

The totalizer wheels 68 are rotatably mounted on a rod 250 which is rigidly held in two end portions 251 and 252 of a U-shaped frame 253, as best shown in Figure 2. Each of these wheels 68 has around its periphery and equally spaced, the numerals 0 to 9, as partially shown in Figures 2 and 26. The uppermost numeral can be seen through opening 66 in the case 64. A ten-tooth pinion 254 is an integral part of each of these wheels 68 and is in constant mesh with an idler gear 255. When the idler gear 255 is rotated one tooth space, the meshing ten-tooth pinion is also turned one tooth space, or one-tenth of a revolution, causing another numeral to be uppermost so that it can be seen through the opening 66. A transfer cam 256 is an integral part of each totalizer wheel 68 and is located on the opposite side of the wheel from the ten-tooth pinion. Seven cam engaging members or transfer pawls 257, rotatably mounted on a rod 258, are in line with and at times engage the transfer cams 256. The rod 258 is mounted between the two ends 251 and 252 of the frame 253. Four spacers 259 maintain the totalizer wheels 68, the idler gears 255 and the transfer pawls 257 in the proper longitudinal positions on the rods 250 and 258. The rod 250 extends through suitable holes in the stationary side plates 169 and 170 and is free to move longitudinally in these holes. A spacer 260 between the end portion 251 of the frame 253 and the stationary end plate 169 limits the movement of the rod 250 and therefore of the entire totalizer toward the left, while a compression spring 261 between the end portion 252 of the frame 253 and the stationary end plate 170 keeps the rod 250 and therefore the entire totalizer to the left when it is free so to move. The frame 253 and therefore the entire totalizer assembly can rotate with the rod 250 in the holes in the stationary end plates 169 and 170. When not otherwise moved, the frame 253 and therefore the entire totalizer assembly is rotated clockwise by a spring 262, one end of which is attached to a prong 263 on the end portion 252 of the frame 253 while the other end of the spring 262 is attached to a rod 264 which is stationarily mounted between the two end plates 169 and 170. A roller 265 is rotatably attached by a stud 266 to the end portion 252 of the frame 253 while a second roller 267 is rotatably attached by a stud 268 to the end portion 251 of the frame 253. These two rollers are used to rotate the frame 253 and therefore the entire totalizer counterclockwise in manners which will be later described.

A locking bar 270 is permanently attached to a frame 271 which is rotatably mounted on the rod 264. This locking bar is essentially wedge shaped along its lower edge, this shape being such as to snugly fit in the space between any two adjacent teeth on the idler gears 255 when that space is directly above the mounting rod 258. A spring 272, having one end attached to a prong 273 on the frame 271 and the other end attached to one of the spacers 259 on the rod 250, tends to keep this wedge-shaped lower edge of the locking bar 270 in the spaces between two adjacent teeth of the various idler gears 255, thereby holding them and the totalizing wheels from turning. The two ends of the frame 271 are adjacent to the two end portions 251 and 252 of the frame 253. As a result, when the frame 253 moves longitudinally of the rod 250, the frame 271 also moves longitudinally on its mounting rod 264 to the same extent.

*The adding cam*

Figure 22:
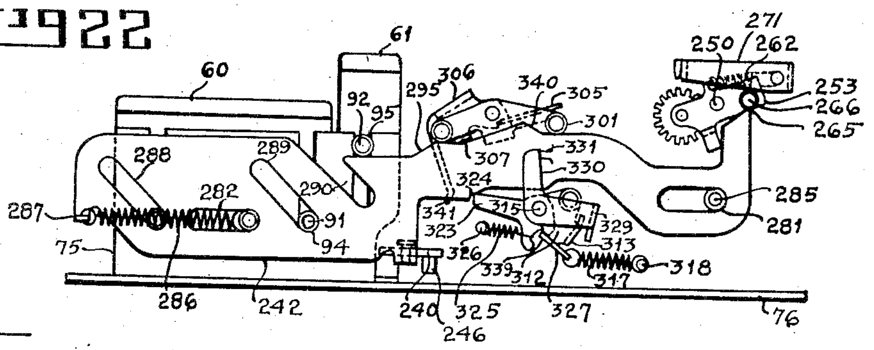
Figure 22 shows the same parts which are shown in Figure 21, but shows their positions when the "+" is fully depressed.

The adding cam 242 is located adjacent to the right side of the key support 75 and the stationary side plate 170. The form of the adding cam 242 is best shown in Figures 21 and 22. Two rollers 280 and 281 engage two slots 282 and 283 respectively in the adding cam 242. The roller 280 is rotatably attached by means of a stud 284 to the key support 75, while the roller 281 is rotatably attached by means of a stud 285 to the stationary end plate 170. With this mounting, the adding cam is free to move forward and backward, the edges of the slots rolling on the rollers. The adding cam is normally maintained in its extreme rearward position by a spring 286, one end of which is attached to a prong 287 on the adding cam 242, while the other end is attached to the stationary stud 284.

Two diagonal slots 288 and 289 in the adding cam 242 engage the two rollers 93 and 94 which are rotatably mounted on the two pins 90 and 91 of the "+" key 60. When the adding cam 242 is in its extreme rearward position, as normally maintained by the spring 286, these diagonal slots 288 and 289 maintain the "+" key in its uppermost position, as shown in Figure 21, the two slots moving simultaneously in a horizontal direction maintaining the "+" key in a level position when this key is moved. Depressing the "+" key will obviously cause the adding cam to move forward.

A third diagonal slot 290 in the adding cam 242 is open at its upper end and engages the roller 95 which is rotatably attached by the pin 92 to the "—" key 61. The key 61 is normally maintained in its uppermost position by one of the key springs 89 as previously described. Depressing the "—" key 61 obviously causes the adding cam 242 to move forward and also causes the "+" key 60 to lower. Since depressing the "—" key 61 causes the "+" key 60 to lower at the same time, it is permissible to depress both keys simultaneously when subtracting is desired.

The action of the adding cam 242 will be explained under the heading "The Adding Operation."

*Positioning the adding racks and the subtracting gears*

Before the entering of any amount to be added or subtracted, all of the adding racks 131 to 136 inclusive are in their zero positions, in which position adding rack 131 is shown in Figure 4, being pulled forward by the springs 197 against the transfer detent hooks 209. All of the "Item" indicating wheels 67 have "0" uppermost and showing through the opening 65 in the case 64, and the rack carriage assembly is at its extreme right position. With the racks and the rack carriage so positioned, a prong 291 on the rack actuator 101 is in the notch 205 of the adding rack 131. Depressing any one of the amount keys 51 to 59 inclusive causes the rack actuator 101 to move to the rear, the amount that it moves depending upon the amount key which is depressed as previously explained under the heading "The Keyboard Mechanism." Rearward movement of the rack actuator 101 also causes rearward movement of the rack 131 by the same amount, less the clearance between the prong 291 and the notch 205. Assuming that it is the "6" key 56 that is depressed, the rack actuator will move to the rear a distance approximating the length of 6½ tooth spaces of the gear teeth on the adding rack 131, as previously explained. The adding rack 131 will therefore move slightly less than this distance, or sufficiently so that six of the prongs in the notched portion 191 on the adding rack 131 have passed the latch 192 and the adding rack 131 will be held six spaces to the rear of its zero or original position by the latch 192 when it is no longer held in position by the prong 291 of the rack actuator 101.

As each adding rack 131 to 136 inclusive is moved to the rear, the auxiliary rack 188 thereon causes the counterclockwise rotation of the gear 189 meshed therewith, about the support rod 177. With this arrangement of parts, as the teeth 190 on each adding rack move to the rear, the teeth on the upper side of the gear 189 associated therewith move forward to the same extent.

When any of the amount keys 51 to 59 inclusive nears the end of its downward travel, its roller, such as the roller 126 on the "6" key 56, enters a vertical section of the slot in the rack actuator 101 which it engages, such as the slot 116 which is engaged by the roller 126, so that during the final movement of the amount key the rack actuator 101 is prevented from moving and it in turn prevents the movement of the adding rack 131 beyond a slight amount due to clearance between the prong 291 and the notch 205, which is not enough to allow another prong in the notched portion 191 of the adding rack to pass the latch 192. During this last part of the amount key travel, when the rack actuator and the rack are both motionless, the escapement member 231 is rotated clockwise by the downwardly extending boss 248 on the key lockout member 137, thereby allowing the rack carriage to move approximately a half space to the left under the influence of the spring 219. During this movement to the left, the notch 205 in the adding rack 131 is disengaged from the prong 291 on the rack actuator, allowing the rack actuator to return forward under the influence of the spring 121 when the operator releases the depressed amount key. At the same time, the amount key is raised by the key spring 89 and by the slot, such as slot 116 in which the roller, such as 126, is positioned, and the key lockout member 137 is returned to itst forward position by the spring 153, finally unlocking the other keys. In the early part of the forward travel of the key lockout member, the escapement member 231 returns to its original position, thereby allowing the rack carriage assembly to further move to the left until the right side of the prong 291 on the rack actuator engages the left side of the next adding rack 132. When the rack actuator has moved forward to the full extent of its travel, the prong 291 is in line with the notch 205 of the adding rack 132 so that the rack carriage assembly now can move to the left until the extension 236 of the escapement member 231 engages the next notch 238 on the bottom 161 of the rack carriage side plate 160, thereby preventing further movement of the rack carriage assembly. With the rack carriage in this position, the prong 291 is properly positioned in the notch 205 of the adding rack 132 so that movement of the rack actuator 101 will cause the rack 132 to move, so adding rack 132 can be positioned in the same manner as was the adding rack 131, followed by the positioning of the adding racks 133, 134, 135, and 136, or as many thereof as is necessary to enter the amount to be added or subtracted.

*The adding operation*

After the necessary adding racks 131 to 136 inclusive have been positioned in the manner just described, the amount which has been so entered in the machine can be added to the amount in the totalizer, subtracted from the amount in the totalizer, or eliminated if incorrect. We will now assume that the amount is to be added.

The operator depresses the "+" key 60, thereby causing the key lockout member 137 to immediately move slightly to the rear, locking all the other keys excepting the "Error" key so that they cannot be depressed. Depression of the "+" key 60 also causes the adding cam 242 to immediately start moving forward and to continue this forward movement during the entire downward travel of the "+" key.

Early in the forward movement of the adding cam 242 a sloping surface 295 thereon engages a roller 296 which is rotatably attached by a stud 297 to an arm 298 of a rack detent holding member 299, to another arm 300 of which is rotatably attached another roller 301 by means of a stud 302. The rack detent holding member 299 extends from the inner side of the stationary side plate 169 to the inner side of the stationary side plate 170 and is pivotally attached to these two side plates by two studs 303 and 304. Forward movement of the adding cam 242 therefore causes the rack detent holding member 299 to rotate a slight amount in a clockwise direction until it assumes the position shown in Figure 22. Suitably attached to the rack detent holding member 299, as by riveting, is a multi-pronged detent 305, the number of prongs being one less than the number of wheels in the totalizer or, in the case of the machine being described, six. This detent 305 is made of flexible material, such as thin spring steel. The prongs thereon are positioned above the six rack detents 206 which detain those racks that may have to be used for effecting transfer in a manner to be described later. At the beginning of the adding operation the prongs of the detent 305 did not engage the rack detents below them but were in the position shown in Figure 4. After the rack detent holding member 299 has been rotated clockwise as just described, the prongs on the detent 305 engage the rack detents below them in the manner shown in Figure 18, causing flexing of the prongs as shown.

A rack restoring member 306 is also pivotally mounted on the studs 303 and 304 which carry the rack detent holding member 299. A projection 307 on the rack restoring member 306 extends under the arm 298 of the rack detent holding member 299 so that clockwise rotation of the rack restoring member 306 is limited by the position of the rack detent holding member 299. The clockwise rotation of the rack detent holding member just described therefore allows the rack restoring member to rotate slightly in a clockwise direction.

When the rack detent holding member 299 has completed its clockwise rotation, a sloping surface 308 of the adding cam 242 engages the roller 265 which is rotatably mounted on the end portion 252 of the totalizer frame 253 and further forward movement of the adding cam 242 causes counterclockwise rotation of the totalizer frame 253 about the rod 250, thereby causing the idler gears 255 to mesh with the adding racks or the reset racks that are below them. If a six digit number has been entered in the machine for adding, the idler gears will mesh with the six adding racks 131, 132, 133, 134, 135 and 136 and with the reset rack 181. If a five digit number has been entered, the adding rack 136 will not be engaged, but the reset rack 182 will be engaged. In like manner, each decrease of one digit in the number entered causes one less adding rack and one more reset rack to be engaged by the idler gears 255, the reset racks being used for effecting transfers under certain circumstances.

As the totalizer frame 253 is rotated so that the idler gears 255 lower, the locking bar 270 also lowers, rotating around the rod 264 under the influence of the spring 272 until the stud 266 attached to the frame 253 engages the under side of the locking bar frame 271, by which time the idler gears 255 have started to mesh with the teeth 190 on the upper edges of the adding racks or with the teeth 204 on the upper edges of the reset racks. Further rotation of the totalizer frame causes the stud 266 to raise the locking bar frame 271, thereby disengaging the locking bar 270 from the idler gears 255 so that they can rotate. The various parts are then as shown in Figures 17 and 22, Figure 17 showing the idler gear 255 meshed with the teeth on the adding rack 131 which has been moved back by the amount key 56 a distance of six spaces and is held there by the latch 192, while Figure 22 shows the stud 266 engaging the locking bar frame 271.

At about the same time that the totalizer gears are being brought into engagement with the racks below them, a roller 309 comes to the end of a surface 310 of the adding cam 242 so that further forward movement of the adding cam releases this roller as shown in Figure 22. This roller 309 is rotatably attached by a stud 311 to an end portion 312 of a feeler bar 313 which is pivotally attached by means of two studs 314 and 315 to the stationary side plates 169 and 170 respectively, the stud 315 being attached to the end portion 312 of the feeler bar 313 and the stud 314 to an end portion 316 of the same feeler bar. Attached to an extension 327 on the end portion 312 is a spring 317, the other end of which is attached to the stationary side plate 170 (not shown in Figures 21 and 22) by means of a stud 318. This spring 317 tends to rotate the feeler bar 313 in a counterclockwise direction about the studs 314 and 315. Under the racks which the idler gears 255 engage, there is a stepped portion 319 of the feeler bar 313, the steps being arranged with the highest step 320 at the right-hand end and the lowest at the left-hand end with uniformly graduated steps between. The form of the stepped portion 319 of the feeler bar 313 is best shown in Figure 23, which figure also indicates the position of said stepped portion 319 relative to the racks and to the totalizer idler gears 255 when the rack carriage is in its starting, or extreme right position. The relative positions of the stepped portion 319 and the totalizer idler gears remains unchanged as the rack carriage is shifted to the left. When the roller 309 is released by the forward movement of the adding cam 242 so that the feeler bar 313 can rotate counterclockwise under the influence of the spring 317, the highest step 320 engages the lower edge 321 of the rack above it, provided that rack has been moved out of its zero position by the depressing of an amount key. If, however, the rack above the step 320 is in its zero position, the step 320 will enter a notch 322 in the lower edge of the rack, allowing the feeler to rotate farther under the influence of the spring 317. This rotation will continue until one of the steps engages the lower edge 321 of a rack which is out of its zero position, as one must be if any amount has been entered in the machine for adding or subtracting.

As the adding cam 242 nears the end of its travel forward, a latch 323, which is pivotally mounted on the stud 315, enters a notch 324 in the adding cam 242, being rotated into that position by a spring 325, one end of which is attached to the latch 323 and the other end to the stationary side plate 170 (not shown in Figures 21 or 22) by means of a stud 326. When the latch 323 is in the notch 324, the adding cam cannot travel far enough to the rear to disengage the idler wheels 255 on the totalizer from the racks below them.

After the idler gears 255 are fully engaged with the racks below them, the rack latches 192 are disengaged from the racks by means of a latch releasing bar 329 which is pivotally attached to the stationary side plates 169 and 170 by the two studs 314 and 315. The latch releasing bar 329 has an upwardly extending arm 330. A projeection 331 on the side of the adding cam 242 engages the arm 330 as the adding cam moves forward, causing the latch releasing bar 329 to rotate about the studs 314 and 315 until the latch releasing bar 329 engages the extensions 332 on the latches 192, after which further movement of the latch releasing bar will cause the latches to rotate about the rod 193 until they are no longer in engagement with the notched portion 191 of the adding racks 131 to 136 inclusive.

As soon as the latches 192 are disengaged from the adding racks, any of those adding racks 131 to 136 inclusive which are out of their zero positions immediately commence to move forward under the influence of their springs 197, turning the idler gears 255 which are meshed with them, which in turn rotate the totalizer wheels 68. If the amount rack has been moved to the rear six spaces by the "6" amount key 56, as has rack 131 in Figure 17, then as this rack travels to its zero or original position, it causes the totalizer wheel 68 to rotate counterclockwise six-tenths of a revolution, advancing the numerals six places. If the numeral "0" was uppermost before the rack movement began, the numeral "6" will now be uppermost. All of the adding racks that are not in their zero or original positions will move in the same way into their zero positions, where they are stopped by the rack detents 206 unless the totalizer wheel of the next lower order has passed from "9" to "0" during its forward travel, in which case a transfer must be effected, that is, the totalizer wheel next to the left of the one that has passed from "9" to "0" must be moved one extra space. How this is accomplished will now be described.

The transfer cam 256 on each totalizer wheel has a protruding portion 333 which is best shown in Figures 18 and 19. It should be noted that the transfer cam shown in these Figures 18 and 19 are not the ones attached to the totalizer wheels 68 shown in those same figures, but belong to the next wheels to the right. With the transfer cam 256 in the position shown in Figure 18, the wheel of which it is a part is so positioned that when the totalizer is rotated to its original position, as shown in Figures 4 and 21, the numeral "9" will be uppermost, so that it may be seen through the opening 66 in the case 64. When the transfer cam 256 is in this position, it engages an arm 334 of the transfer pawl 257 but has not yet appreciably moved it, but further rotation in a counterclockwise direction, as would be the movement when passing from "9" to "0," causes the transfer pawl 257 to rotate about the rod 258 and a transversely extending portion 335 of the transfer pawl 257 engages a surface 336 of the rack detent 206 and causes it to rotate clockwise about the rod 202, as shown in Figure 19, thereby raising the hook 209 on the rack detent 206 to a position approximately as shown in Figure 19. When rotated to this position, the prong of the detent 305, which has previously rested on top of a protrusion 328, now drops in front of this protrusion, preventing the return of the rack detent 206 to its original position when the transfer cam 256 has progressed to a point where it would no longer hold the rack detent in this position. With the rack detent so raised, the rack, such as 181 in Figure 19, is no longer stopped in its zero or original position by the detent but is allowed to travel one extra space, or until the end of the slot 179 engages the support rod 177, as shown in Figure 20.

A downwardly extending arm 337 on each rack detent 206 assumes the position shown in Figure 4 when the rack detent has not been rotated by one of the transfer pawls. When so positioned and when the adding or reset rack beside it is in the zero position, as shown in Figure 4, the stepped portion 319 of the feeler bar 313 can rise in the notch 322 in the rack. If, however, the rack detent is in the released position, but the rack has not moved forward to effect the transfer, as shown in Figure 19, then the downwardly extending arm 337 is directly over the stepped portion 319 of the feeler bar 313 so the feeler cannot rise. Movement of the rack into its extreme forward position which effects the transfer, will cause the rack detent 206 to rotate farther, due to the engagement of the hook 209 and a sloping surface 338 on the rack, so that the rack detent assumes the position shown in Figure 20, in which position the feeler is free to rise. With this arrangement, the feeler can rise if the rack is in its zero position and the detent has not been tripped or if the detent has been tripped and the rack has moved to effect the transfer, but the feeler cannot rise if the rack has not yet returned to its zero position of if the rack detent has been tripped by the transfer cam and the rack has not moved forward to effect the transfer. The stepped arrangement is used because of the possibility of a progressive transfer, that is, a condition where the totalizer wheels 68 originally show several "9's" next to each other, in which case transferring into one wheel trips the detent for the next one on the left and so on as far as the 9's extend. By having the stepped arrangement on the feeler, the feeler first engages the rack at the extreme right of those that are being used to actuate the totalizer. That rack must be in its zero position before the feeler can engage the next rack to the left. Of course, there can be no transfer required of this first rack. By the time the highest step 320 of the feeler can rise in the notch 322 of the rack above it, the rack detent 206 for the rack of the next higher order will have been tripped. If this is the case and the transfer has not been completed or if the rack has not yet moved to its zero position, the second step of the feeler will prevent the feeler from rising. Thus progressively the feeler tests each rack and its attendant detent to be sure that they are all in their proper positions.

When all the racks and their attendant detents are in their proper positions, the feeler bar is allowed to rise fully and in so doing, the extension 316 thereon engages a surface 339 on the latch 323, causing it to rotate about the stud 315 until the latch is free from the notch 324 in the adding cam 242, the feeler spring 317 being strong enough to overcome the latch spring 325. The adding cam is now free to travel to the rear, toward its original position.

As the adding cam 242 moves to the rear, the latch releasing bar 329 is allowed to return to its original position so that the latches 192 again engage the notched portions 191 of the adding racks 131 to 136 inclusive. Further movement of the adding cam causes the roller 309 on the feeler bar 313 to be moved downward until it rides on the surface 310, at which point the feeler is entirely free from all of the racks and rack detents. At about the same time that the feeler is being retracted, the totalizer idler gears 255 are being disengaged from the racks below them. Reversing the action when they were engaging the racks, the first upward movement of the idler gears allows the locking bar 270 to lower so as to engage the idler gears 255 before they are entirely disengaged from the racks, thus keeping them in their proper positions. After the totalizer idler gears are disengaged from the racks, the rack detent holding member 299 is rotated counterclockwise, raising the detent 305 so its prongs cannot engage the protrusions 328 on the rack detents 206. This counterclockwise rotation of the rack detent holding member is caused by a sloping surface 340 which engages the roller 301. This counterclockwise rotation of the rack detent holding member 299 also causes counterclockwise rotation of the rack restoring member 306 due to the projection 307 thereon which engages the lower side of the arm 298 of the rack detent holding member 299. During this counterclockwise rotation of the rack restoring member 306, a downwardly projecting portion 341 engages the front ends of any racks which have been used for effecting a transfer and moves them to the rear sufficiently so that the rack detents 206 can return to their original positions, after which further movement of the adding cam 242 allows the rack restoring member to rotate slightly in a clockwise direction so that the downwardly projecting portion 341 no longer exerts pressure against the racks. After the racks have been restored to their original or zero positions, the latch detent 240 which is mounted on the adding cam 242 as previously described under the heading "Mechanism for Shifting the Rack Carriage" and which is now rotated by the spring 243 so that its heel 245 is against the side of the adding cam 242, engages the rack carriage latch 227 by means of the downwardly extending arm 246 and causes the latch to rotate about the stud 228 until it is free from the notched member 216, after which the rack carriage can return to its original position at the extreme right of its travel, under the influence of the spring 215. The latch 240 is held out of engagement with the notched member 216 until the rack carriage has moved the entire distance to the right, when the rack carriage mounting plate 162 engages the edge 247 of the detent and forces the detent out of engagement with the latch 227, allowing the latch to again engage the notched member 216.

While the adding cam 242 has been moving to the rear, it has been causing the "+" key 60 to rise, which in turn has allowed the key lockout member 137 to return forward under the influence of the spring 153. When the "+" key 60 has completed its rise and the key lockout member has moved all the way to the front, the keys that have been locked so that they could not be depressed are again released.

*The subtracting operation*

If the amount that has been entered in the machine by means of the amount keys, as described under the heading "Positioning the Adding Racks and the Subtracting Gears," is to be subtracted from whatever amount has been previously accumulated in the totalizer, the totalizer wheels 68 must be rotated in the opposite direction from that required for adding; they must be rotated clockwise instead of counterclockwise. To accomplish this, the entire totalizer is shifted to the left so that the idler gears 255 are over certain of the gears 189 instead of being over certain of the adding racks 131 to 136 inclusive or of the reset racks 181 to 186 inclusive, as they were when adding.

Figure 9:
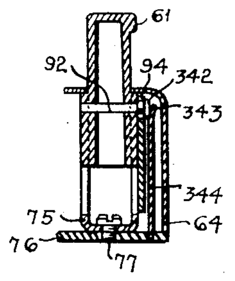
Figure 9 is a vertical sectional view along line 9—9 as shown in Figure 2, and shows the relation of the "—" and the totalizer shifting member.

To cause subtraction of the amount entered in the machine, the operator depresses the "—" key 61, which causes the adding cam 242 to move forward and the "+" key 60 to lower, as described under the heading "The Adding Cam." The pin 92 has a head 342 which engages a sloping portion 343 of a shifting member 344, as best shown in Figures 2 and 9. The shifting member 344 has two feet 345 and 346 which extend downward into slots in the base plate 76, as best shown in Figure 3, there being a slight clearance between the feet 345 and 346 and their engaging slots so that the upper portion 347 of the shifting member 344 can freely move a slight distance transversely of the machine, pivoting about the feet 345 and 346. An extension 348 of the end portion 252 of the totalizer frame 253 has its end extending along the outer side of the shifting member 344 as shown in Figure 3. When the spring 261 moves the totalizer frame 253 to the left, the projection 348 moves the upper edge 347 of the shifting member to the left so that the sloping portion 343 is in close proximity to the head 342 of the pin 92 when the "—" key 61 is in its uppermost position as shown in Figure 9. Downward movement of the key 61 will almost immediately cause the head 342 of the pin 92 to engage the surface of the sloping portion 343 of the shifting member 344 and further downward movement of the key will therefore cause the upper portion 347 of the shifting member to move to the right. This in turn, through the extension 348 on the totalizer frame 253 will cause the totalizer to move to the right sufficiently so that the totalizer idler gears 255 are vertically aligned with the gears 189 on the rack carriage, where the totalizer will stay as long as the "—" key 61 is depressed.

With the exception of the shifting of the totalizer as just explained, which causes the totalizer wheels to rotate in the opposite direction, the steps when subtracting are the same as when adding.

Since the totalizer wheels are rotating clockwise during subtraction, the protrusion 333 on the transfer cam 256 approaches the arm 334 of the transfer pawl 257 from below instead of from above, as was the case when adding. As a consequence, the protrusion 333 moves the transfer pawl as the totalizer wheel moves from its "0" position to its "9" position, whereas when adding this occurred as the totalizer wheel moved from its "9" position to its "0" position. This movement of the transfer pawl 257 by the transfer cam 256 has the same effect on the rack detent 206 whether adding or subtracting, that is, it raises the hook 209 so as to allow the rack otherwise detained thereby to move forward one extra space, thereby moving the totalizer wheel one extra space, causing the numeral of the next lower order, when subtracting, to be uppermost on the totalizer wheel of the next higher order. The passing of one totalizer wheel from its "0" position to its "9" position has therefore caused the subtraction of 1 from the next higher totalizer wheel.

The feeler bar 313 has the same action as when adding, so it will disengage the latch 323 from the adding cam 242 as soon as all of the racks and rack detents are in their proper positions, allowing the adding cam to move back under the influence of the spring 286 which in turn allows the "—" key 61 to rise under the influence of its key spring 89. As the "—" key nears the top of its travel, the head 342 of the pin 92 allows the upper portion 347 of the shifting member 344 to move to the left which in turn allows the totalizer to return to its original position.

*Correcting an error*

When, for any reason, the operator wishes to eliminate an amount which has been entered in the machine by means of the amount keys without having the totalizer affected, this is accomplished by depressing the "Error" key 62. The pin 98 in the "Error" key engages the top edge of a lever 349 which is pivotally attached to the key support 71 by a stud 350. A lower portion 351 of the lever 349 engages the front end of a bar 352 which rests on the base plate 76. The rear end of the bar 352 engages an arm 353 which is a part of the latch releasing bar 329. The bar 352 has a notch 354 therein, as best shown in Figure 13, into which extends the lower end of an arm 355 which is a part of a transverse member 356. The transverse member 356 is pivotally mounted on two studs 357 and 358, the stud 357 being permanently attached to a portion of the key support 71 while the stud 358 is permanently attached to a portion of the key support 75. On the opposite end of the transverse member 356 from that on which is located the arm 355 is a second arm 359, the lower end of which extends into the plane of the rack carriage latch 227 as shown in Figure 13. A spring 360 has its lower end attached to the lever 349 and its upper end attached to a stationary stud 361 which is attached to the key support 71. This spring 360 maintains constant engagement between the pin 98 and the lever 349 and will cause the "Error" key to rise when it is free to do so.

Depressing the "Error" key 62 causes the counterclockwise rotation of the lever 349 about the stud 350 so that the lower portion 351 of the lever pushes the bar 352 to the rear which in turn pushes the arm 353 of the latch releasing bar 329 to the rear, causing the latch releasing bar to rotate counterclockwise about the studs 314 and 315 so that the latch releasing bar 329 engages the extensions 332 on the rack latches 192 and releases the latches from the notched portions 191 of the adding racks 131 to 136 inclusive, allowing these racks to return to their original or zero positions. The rearward movement of the bar 352 also causes the counterclockwise rotation of the transverse member 356 about the studs 357 and 358, since the lower end of the arm 355 is in the notch 354 and therefore moves when the bar 352 moves. Rearward movement of the lower end of the arm 355 also causes rearward movement of the arm 359 of the transverse member 356, therefore, when the bar 352 is moved to the rear, the lower end of the arm 359 engages the rack carriage latch 227 and rotates it about the stud 228 until it is no longer in engagement with the notched member 216. The rack carriage can now return to the right. Assuming that the rack carriage is not at its extreme right position when the "Error" key is depressed, the latch detent 240, which is mounted on the adding cam 242, will have been rotated about its stud 241 by the spring 244 as far as it can go and will be in the position shown in Figure 24. The downwardly extending arm 246 on the latch detent 240 will therefore hold the latch 227 out of engagement with the notched member 216 until the rack carriage has returned to its extreme right position. The depressing of the "Error" key 62 has therefore caused all of the displaced amount racks 131 to 136 inclusive to return to their original positions and has caused the rack carriage assembly to return to its original position and the machine is in exactly the same condition as it was in before the last amount was entered by means of the amount keys.

*Principles used in clearing the totalizer*

The totalizer is cleared (all wheels returned to zero) by (1) moving the reset racks to the extreme rear, (2) engaging the totalizer idler gears with the rack carriage gears that are meshed with the reset racks and which are used when subtracting, (3) allowing the reset racks to be moved forward by their springs until the protrusions on the transfer cams engage the transfer pawls, at which time the totalizer wheels will be at zero, (4) stopping the rotation of the wheels at this point, (5) disengaging and locking the idler gears, and (6) allowing the reset racks to return to their original positions.

*The clearing operation*

When it is desired to clear the totalizer so that all its wheels 68 will register "0," the operator depresses the "Clear" key 63. When the "Clear" key 63 is depressed, the first downward movement thereof causes the key lockout member 137 to move to the rear because of the action of the pin 96 of the "Clear" key in the slot 154 of the key lockout member. This rearward movement of the key lockout member prevents the depressing of any of the other keys with the exception of the "Error" key 62.

The roller 97 which is rotatably mounted on the pin 96 in the "Clear" key 63 engages a sloping edge 365 of a clearing cam 366 best shown in Figures 27 and 28. This clearing cam 366 has two horizontal slots which engage two rollers 369 and 370 respectively. The roller 369 is rotatably mounted on the stud 350 which is secured to the key support 71, while the roller 370 is rotatably mounted on a stud 371 which is secured to the stationary side plate 169. A spring 372 has one end attached to an extension 373 on the clearing cam 366 and the other end attached to a stud 374 secured to the stationary side plate 169. The clearing cam 366 will therefore be moved forward, guided by the rollers 369 and 370, unless such movement is prevented otherwise.

Depressing the "Clear" key 63 causes the clearing cam 366 to be moved to the rear by the action of the roller 97 on the sloping edge 365. Very early in the rearward travel of the clearing cam 366, a roller 375, which is rotatably attached to the rack restoring member 306 by means of a stud 376, is engaged by a vertical edge 377 of a restorer actuating arm 378. This restorer actuating arm 378 is pivotally attached by means of a stud 379 to the clearing cam 366 and is normally rotated in a clockwise direction about the stud 379 by a spring 380, one end of which is attached to the restorer actuating arm and the other end of which is attached to a stop member 381 which is pivotally attached to the clearing cam 366 by means of a stud 382. When the clearing cam 366 is in its extreme forward position, as shown in Figure 27, the clockwise rotation of the restorer actuating arm 378 is limited by the engagement of the bottom of a notch 383 therein with the roller 375. When the restorer actuating arm is in this position, a lip 384 thereon engages a ledge 385 on a detent 386 which is pivotally attached to the clearing cam 366 by the stud 382. A transverse extension 387 on the stop member 381 engages the front edge of the detent 386 so that clockwise rotation of the stop member, induced by the spring 380, also causes clockwise rotation of the detent 386, both the stop member and the detent rotating about the stud 382. When free to do so, the detent will therefore rotate until the ledge 385 thereon is under the lip 384 of the restorer actuating arm 378, preventing the downward movement of that portion of the restorer actuating arm.

After the vertical edge 377 of the restorer actuating arm 378 engages the roller 375, further rearward movement of the clearing cam 366 causes the counterclockwise rotation of the rack restoring member 306 about the studs 303 and 304 until the roller 375 rides on the horizontal upper edge 388 of the restorer actuating arm 378, as shown in Figure 28, after which further movement of the clearing cam 366 to the rear will cause no further counterclockwise rotation of the rack restoring member 306. During the counterclockwise rotation of the rack restoring member 306, the downwardly projecting portion 341 engages the front edges of the reset racks 181 to 187 inclusive and moves them rearward to the full extent of their travel.

At the same time that the rack restoring member 306 is being rotated counterclockwise, a sloping slot 389 in the clearing cam 366, engaging a transverse extension 390 on a transfer pawl stop 391, causes the transfer pawl stop 391 to rotate about two studs 392 and 393, which are secured respectively to the stationary side plates 169 and 170, until the transverse extension 390 rides on the horizontal upper edge 394 of the clearing cam 366, as shown in Figure 28. This raises the transfer pawl stop 391 from the position shown in Figures 17, 18 and 19 to the position shown in Figures 30 and 31. Each transfer pawl 257 has a spring 395 mounted thereon, of which one end 396 engages the upper edge of the transfer pawl stop 391 while the other end 397 extends across the front edge of an arm 398 on the transfer pawl 257. This spring therefore tends to rotate the transfer pawl 257 clockwise about the rod 258 until stopped by the engagement of some part of the arm 398 on the transfer pawl 257 with the front of the locking bar 270.

When the transfer pawl stop 391 is rotated clockwise, an arm 400 on the transfer pawl stop engages the sloping edge of a transverse extension 402 on the shifting member 344 so that further rotation of the transfer pawl stop causes the upper portion 347 of the shifting member to move to the right, thereby shifting the totalizer so that its idler gears 255 are vertically aligned with the gears 189 that mesh with the reset racks 181 to 187 inclusive. This shifting of the totalizer is the same as is used when subtracting from the totalizer.

After the rearward movement of the reset racks and the rotation of the transfer pawl stop have been completed, further rearward movement of the clearing cam 366 causes a sloping edge 403 thereon to engage the roller 267 which is rotatably secured to the totalizer frame 253 by the stud 268 and still further movement to the rear of the clearing cam causes the totalizer to be rotated counterclockwise so that its idler gears 255 mesh with those gears 189 of the rack carriage which are directly beneath them. The locking bar 270 stays in engagement with the idler gears 255 until they start to mesh with the gears 189, after which the locking bar rises to release the idler gears. This action was fully described under the heading "The Adding Operation." When the idler gears 255 are fully meshed with the gears 189, the springs 395 on the transfer pawls 257 cause the transfer pawls to rotate clockwise about the rod 258 until a step 404 on each transfer pawl is beneath the locking bar 270 as shown in Figure 30. If, however, any totalizer wheel is in its zero position, then its transfer cam 256 will hold the transfer pawl in the position shown in Figure 31, in which position the step 404 does not engage the lower edge of the locking bar 270. When a totalizer wheel and its transfer pawl are in the positions just described and shown in Figure 31, the front edge of the arm 398 of the transfer pawl is in engagement with the upper edge of the transfer pawl stop 391, as shown in Figure 31, thereby preventing further counterclockwise rotation of the transfer pawl. Since the transfer pawl cannot turn counterclockwise, the engagement of the arm 334 of the transfer pawl and the protruding portion 333 of the transfer cam prevents the totalizer wheel 68 of which this transfer cam is a part, from turning in a clockwise direction, so it is held in its zero position. If any one or more of the totalizer wheels is out of its zero position, the transfer pawls associated therewith will be rotated by the springs 395 so that the steps 404 thereon are beneath the locking bar 270, thereby holding the totalizer idler gears 255 in engagement with the gears 189 on the rack carriage.

At this stage in the rearward movement of the clearing cam 366, the cam and the parts which it engages are in the positions shown in Figure 28. As the clearing cam 366 has moved to the rear, the upper end of the stop member 381 has passed several downward projections 410 on a stationary member 411. The spring 380 rotates the stop member about the pivot 382 so that the end of the stop member remains in engagement with the stationary member 411. This being the case, if the operator releases the "Clear" key 63 when the clear cam has been moved only partially to the rear, the clear cam cannot move forward and the "Clear" key will remain partially depressed.

Further movement of the clear cam 366 to the rear causes an upwardly projecting portion 412 of the detent 386 to engage a transverse extension 413 on the stationary member 402 so that further rearward movement of the clearing cam causes the detent 386 to rotate about the stud 382 until the ledge 385 on the detent is no longer beneath the lip 384 of the restorer actuating arm 378. The restorer actuating arm is now free to rotate counterclockwise about the stud 379. Since all of the reset racks 181 to 187 inclusive are beinng pulled forward by their springs 197 and since the front edges of these reset racks are in engagement with the downwardly extending portion 341 of the rack restoring member 306, the rack restoring member will now rotate clockwise about its studs 303 and 304, the roller 375 thereon forcing the horizontal upper edge 388 of the restorer actuating arm 378 downward, as shown in Figure 29. This leaves all of the reset racks 181 to 187 inclusive free to move forward under the influence of their springs 197. If, as previously explained, a totalizer wheel is in its zero position, it is prevented from clockwise rotation, which is necessary in order that the reset rack associated therewith can move forward, so such reset racks do not move forward at this time. Each reset rack associated with a totalizer wheel which is not in its zero position does move forward under the influence of its spring 197, thereby causing the totalizer wheel to rotate clockwise, until the totalizer wheel is in its zero position, at which time the protruding portion 333 of the transfer cam 256 causes the transfer pawl 257 associated therewith to rotate about the rod 258 until the arm 398 engages the reset pawl stop 391, preventing further rotation of the totalizer wheel. As the same time, the step 404 of that reset pawl is moved from beneath the lower edge of the locking bar 270 so that that particular reset pawl no longer prevents the totalizer from rotating so as to disengage the idler gears 255 from the gears 189.

The rotation of the detent 386 due to the engagement of its upwardly extending portion 402 and the transverse extension 413 of the stationary member 411 has also caused counterclockwise rotation of the stop member 381 due to the engagement of the transverse extension 387 thereon and the detent 386. This moves the stop member out of engagement with the stationary member 411, as shown in Figure 29, so that the clearing cam is now free to travel forward as soon as the operator releases the "Clear" key 63. The stop member 381 is held out of engagement with the stationary member 411 by the detent 386 as long as the detent is held out of its original position by the restorer actuating arm 378. The restorer actuating arm holds the detent from returning to its original position as long as the roller 375 on the rack restoring member holds the restorer actuating arm down as shown in Figure 29.

Forward movement of the clearing cam 366 releases the roller 267 on the totalizer frame 253 so that the totalizer is free to rotate clockwise and disengage the idler gears 255 from the gears 189 unless otherwise restrained. If, however, any one or more of the totalizer wheels 68 are out of their zero positions, then the totalizer idler gears are held in engagement with the gears 189 as previously explained, and will be so held until all totalizer wheels have returned to their zero positions. If the idler gears are so held in engagement with the gears 189, a transverse extension 414 on the end portion 251 of the totalizer frame 253, by engagement with a vertical edge 415 of the clearing cam 366, prevents the clearing cam from moving forward sufficiently to allow any counterclockwise rotation of the transfer pawl stop 391. When all of thhe totalizer wheels 68 are in their zero positions so that all of the transfer pawls have been rotated until the steps 404 thereon no longer are beneath the locking bar 270, the totalizer frame 253 will rotate about the rod 250, provided the clearing cam 366 has moved forward sufficiently to allow this, and the transverse extension 414 on the totalizer frame 253 will rise so as to be out of the path of travel of the vertical edge 415 of the clearing cam 366, leaving the clearing cam free to move forward.

After the totalizer is disengaged, the transfer pawl stop 391 is rotated counterclockwise to its original position, as shown in Figures 17, 18 and 19, in which position the transfer pawls are free to rotate counterclockwise sufficiently to allow the protruding portions 333 of the transfer cams 256 on the totalizer wheels 68 to pass them, but are prevented by the lower edge of the transfer pawl stop 391 from rotating clockwise sufficiently so that the steps 404 on the transfer pawls can be beneath the locking bar 270. Returning the transfer pawl stop 391 to its original position also allows the totalizer to return to the left under the influence of the spring 261 so that the idler gears 255 are again in vertical alignment with the reset racks 181 to 187 inclusive.

Further forward movement of the clearing cam causes the notch 383 in the restorer actuating arm 378 to arrive below the roller 375 on the rack restoring member 306 so that the restorer actuating arm is rotated about the stud 379 by the spring 380 until the bottom of the notch 383 engages the roller 375, at which point the detent 386 and the stop member 381 rotate clockwise about the stud 382 under the influence of the spring 380 until they are in their original positions, as shown in Figure 27, the restorer actuating arm being locked in its upward position by the detent.

During the entire forward movement of the clearing cam 366, the "Clear" key 63 has been moving upward due to the engagement of the sloping surface 365 on the clearing cam and the roller 97 which is attached to the "Clear" key. The totalizer is now cleared and the machine is ready for the next adding or subtracting operation.

While it would be possible to clear the totalizer by means of any seven adjacent adding racks 131 to 136 inclusive and reset racks 181 to 187 inclusive, the use of any racks other than the seven reset racks would require the shifting of the rack carriage to its extreme right after the clearing was completed. Since all but one of the reset racks is required for transfer purposes any way and since the rack carriage is normally at its extreme right when clearing is desired, as that is its position at the end of all adding and subtracting operations, I have chosen to require that the rack carriage be at its extreme right position before the clearing operation is started so as to avoid the necessity of moving it to the right after the clearing operation. To insure this position of the rack carriage, the clearing cam lockout member 234 is provided. This lockout member is pivotally attached to the base plate 76 by means of a stud 416 and is rotated counterclockwise, as viewed from the top, by the spring 233 so that an arm 420 of the lockout member engages the rack carriage mounting plate 160 as shown in Figure 14 if the rack carriage is at its extreme right and as shown in Figure 15 if the rack carriage is not at its extreme right. A sloping surface 417 on the lockout member 234 causes the movement thereof from the position shown in Figure 14 to the position shown in Figure 15 as soon as the rack carriage moves to the left. A heel 418 on the lockout member 234 engages a vertical edge 419 on the clearing cam 366 when the rack carriage is not in its extreme right position, as shown in Figure 15, thereby preventing the clearing cam from moving to the rear which in turn prevents the depressing of the "Clear" key 63. This condition will exist only in case an amount has been entered in the machine by means of the amount keys and has not been followed by the depressing of the "+" key, the "−" key or the "Error" key. In other words, this condition exists only when an adding or a subtracting operation has been started but not completed. If this should occur, the operation must be completed by the depressing of the "+" key, the "−" key or the "Error" key, any one of which will cause the rack carriage to return to the extreme right, as shown in Figure 14, so the lockout member 234 will no longer engage the vertical edge 419 of the clearing cam and the "Clear" key can be depressed.

*Preventing incorrect operation*

Incorrect operation of any calculating machine can be due either to incorrect procedure by the operator or to malfunctioning of the machine.

An operator frequently and unintentionally will depress two amount keys at the same time. When this occurs with the machine herein described, each of the amount keys depressed, such as keys 51 and 52, attempts to move the rack actuator 101 to the rear but, due to the different slopes of the slots, such as slots 111 and 112, which are engaged by the rollers attached to the amount keys 51 and 52 respectively, these keys can be depressed only a portion of their total possible travel, but the depressing of any two adjacent amount keys allows them to be depressed sufficiently so that the rack actuator will move the amount rack, such as 131, sufficiently so that the latch 192 engages one of the notches 191 in the amount rack and prevents it from moving forward, in which case the slots, such as 111 and 112, in the rack actuator 101 prevent the depressed amount keys from rising, warning the operator that an incorrect operation has been attempted. When this occurs, the operator depresses the "Error" key 62 which releases the latch 192 from the amount rack and allows the amount rack to go forward and the two depressed keys to rise. The operator can now enter correctly the amount to be added or subtracted. It is because of the possibility of thus having to use the "Error" key that it is not locked out when the amount keys are depressed.

For proper functioning of the machine, a key should not be depressed while another key is not in its uppermost position. There is a possibility that the operator may try to depress a key before the last depressed key has fully risen. This is prevented by the key lockout member 137 which locks out all keys with the exception of the "Error" key, as previously explained, and prevents the depressing of any key excepting the "Error" key until a previously depressed key has completely risen.

When clearing, the rack carriage assembly must be at the extreme right so that the reset racks 181 to 187 inclusive are in position to be engaged by the idler gears 255. Since clearing normally will be attempted only after the completion of an adding or subtracting operation or after the "Error" key has been depressed, the rack carriage will normally be in the correct position for clearing. There is a possibility, however, that the operator may start an adding or subtracting operation by depressing one or more of the amount keys and not complete the operation by depressing either "+" key, the "−" or the "Error" key, in which case the rack carriage is not in the correct position for clearing and the "Clear" key cannot be depressed since the clearing cam lockout member 234 prevents the movement of the clearing cam 366 which in turn prevents the depressing of the "Clear" key 63.

Partial depression of the "Clear" key 63 by the operator can result in partial actuation of the clearing operations. The stop member 381 engages the notches 410 in the stationary member 411 before any such partial actuation has taken place and prevents the return of the clearing cam 366 and the rising of the "Clear" key 63 until the cam has traveled sufficiently to insure complete actuation of all of the clearing operations.

If an amount key is depressed a major part of tis possible travel but is not fully depressed, incorrect positioning of the adding rack, such as 131, which is then being actuated, will result, possibly without the knowledge of the operator. When this occurs, the latch 192, engaging one of the notches 191, prevents the return of the adding rack, such as 131, when the partially depressed key is released, thereby preventing the return on the adding rack and of the rack actuator 101, which is still in engagement with the adding rack. If the amount key has been depressed any appreciable distance, its return upward when released is prevented by the engagement of its roller with the slot, such as 111, which that roller engages. Failure of the key to rise warns the operator of the partial depression and also prevents the depressing of any other key excepting the "Error" key. Such incorrect partial depression of an amount key can be corrected by completing the depression of the key.

There are several ways in which the machine can operate improperly through no fault of the operator unless means are provided to prevent this. Rapid depressing of an amount key will cause rapid movement of the amount rack moved thereby. To prevent overtravel of the amount rack due to this rapid movement, which overtravel might result in entering an incorrect amount to be added or subtracted, each slot 111 to 119 inclusive in the rack actuator 101 has a vertical portion at its lower end. This causes the rack actuator 101 and therefore the rack, such as 131, which then engages said rack actuator, to stop its movement while the rack is still in engagement with the rack actuator, therefore preventing overtravel that might result in an error.

When adding or subtracting on the totalizer, an amount which has been entered by means of the amount keys, means are provided to prevent the disengagement of the totalizer wheels from the adding racks until adding or subtracting, including all necessary transfers, has been completed. This is accomplished by means of the feeler 313 in a manner previously described.

When returning the totalizer wheels to zero, means are provided to prevent disengagement of the totalizer wheels from the reset racks until all of said totalizer wheels are at zero. Such incorrect disengagement is impossible since the transfer pawls 257 associated with each of the totalizer wheels engage the locking bar 270 in such manner as to hold the idler gears 255 in engagement with the reset racks 181 to 187 inclusive until each totalizer wheel has reached zero and has thereby disengaged the transfer pawl associated therewith from the locking bar. Until all of the transfer pawls are thus disengaged, the idler gears must remain in engagement with the reset racks.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An adding machine including a single set of ten depressible keys labelled from "0" to "9" for registering amounts to be added, a rack actuating member associated with all of the keys in said set of ten keys and caused to move in a direction perpendicular to the direction of movement of said keys when any one of said keys excepting the "0" key is depressed, the amount of movement being different for each key, a plurality of longitudinally moving rack members which are successively associated with said rack actuating member so as to be successively and positively moved thereby, and a plurality of numeral bearing wheels which subsequently are caused to rotate by the rack members.

2. An adding machine including a single set of ten depressible keys for registering amounts to be added, a rack actuating member associated with all of said keys and caused to move different distances by each of the keys when it is depressed, a plurality of longitudinally moving rack members which are successively associated with said rack actuating member and are moved successively by said rack actuating member in the same direction as the rack actuating member is moved, springs associated with said rack members, each such member being associated with a different spring in such a manner that the aforesaid movements of the rack members deflect their associated springs, means for holding the rack members in the positions to which they have been moved, a plurality of numeral bearing wheels, means for associating said wheels with the said rack members after the aforesaid movement, means for releasing said holding means so that said rack members can move in a direction opposite to the direction of their first movement and simultaneously rotate said wheels, the energy required for the last said movement of the rack members and for the rotation of the said wheels being supplied by the aforesaid deflected springs, and means for disassociating the wheels from the rack members after their movements are completed.

3. An adding machine of the ten key type including a single multi-slotted rack actuating member whose slots have various degrees of slope, a plurality of vertically moving keys for registering amounts to be added, each of said keys having means associated therewith which engages one of the slots in the multi-slotted member when that key is depressed, thereby moving the multi-slotted member a distance determined by the slope of the slot therein which the depressed key engages, a plurality of longitudinally moving rack members which are successively moved by said multi-slotted member, each of said rack members having a rack as a part thereof, a plurality of numeral bearing wheels, each having a pinion as an integral part thereof, and means for associating said pinions with said racks so as to rotate said numeral bearing wheels.

4. A computing machine for both adding and subtracting including a multi-slotted rack actuating member whose slots have various degrees of slope, a plurality of vertically moving keys for registering amounts to be added or subtracted, each of said keys having means associated therewith which engages one of the slots in said multi-slotted member when said key is depressed, thereby moving said multi-slotted member a distance determined by the slope of the slot therein which the depressed key engages, a longitudinally moving rack member which is moved by the multi-slotted member, said rack member having a rack along its upper edge and a second rack, a gear rotating about a fixed axis and constantly in mesh with said second rack, a numeral bearing wheel having a pinion as an integral part thereof, said numeral bearing wheel rotating around a fixed axis, an idler gear constantly in mesh with said pinion, means for meshing said idler gear with said first rack in order to rotate said numeral bearing wheel in one direction, and means for meshing said idler gear with the gear which is constantly in mesh with said second rack, in order to rotate said numeral bearing wheel in the opposite direction.

5. A computing machine for both adding and subtracting including a plurality of keys for registering amounts to be entered, a longitudinally moving rack member which is moved by the depressing of said keys, each key causing a different amount of movement, said rack member including a rack, a first numeral bearing wheel having a pinion as an integral part thereof, said pinion being constantly in mesh with said rack, a second numeral bearing wheel having a pinion as an integral part thereof which rotates in one direction for adding and in the opposite direction for subtracting, and means for associating said pinion on said second numeral bearing wheel with said rack member so as to cause rotation of said numeral bearing wheel for subtracting.

6. An adding machine including a plurality of depressible amount keys, a plurality of longitudinally moving rack members, a structure for supporting said rack members, a rack actuating member associated with said depressible keys so as to be moved thereby, a second actuating member associated with said depressible keys so as to be moved thereby, said rack actuating member being moved a different distance by the depressing of each different key, said second actuating member being moved the same distance by the depressing of any of said keys, means associated with said rack actuating member for moving said rack members and means associated with said second actuating member to cause transverse movement of said supporting structure, said second actuating member engaging the various amount keys in such manner as to prevent the depressing of any amount key when another of said amount keys is depressed.

7. An adding machine as described in claim 6 wherein said means associated with said second actuating member to cause transverse movement of said supporting structure includes a transversely moving member which is moved by said second actuating member, a spring which is deflected by the last said movement, said spring being associated with said transversely moving member and with said supporting structure, and an escapement member actuated by said second actuating member to allow said deflected spring to move said supporting structure.

8. An adding machine as described in claim 6 wherein the transverse movement of the supporting structure as caused by said second actuating member deflects a spring, means for holding said supporting structure in the position to which it has been moved, and means for releasing said holding means so that said supporting structure can be returned to its original position by means of said spring.

9. An adding machine including depressible amount keys for registering the amounts to be added, a plurality of rack members, a structure for supporting said rack members, means associated with said adding keys for moving said rack members, springs associated with said rack members and deflected by the movement thereof, each rack member being associated with a different spring, means for holding said rack members in the positions to which they are moved, means associated with said amount keys for causing transverse movement of said supporting structure, a spring deflected by said transverse movement of said supporting structure, means for holding said supporting structure in the position to which it has been moved, a plurality of numeral bearing wheels each having a pinion as an integral part thereof, means for associating said pinions with said rack members, means for releasing the first aforesaid holding means so that the deflected springs associated therewith can move said rack members in a direction opposite to the direction of their first movement, means for disassociating said pinions from said rack members, and means for releasing the second aforesaid holding means so that the spring associated with the supporting structure can return said supporting structure to its original position.

10. An adding machine as described in claim 9 wherein is included a depressible adding key, said adding key causing the association of said pinions with said rack members, the disassociation thereof and the releasing of both of said holding means.

11. An adding machine as described in claim 10, wherein is included a depressible key which causes the releasing of both of said holding means without causing the association of said pinions with said rack members.

12. A computing machine for both adding and subtracting including depressible amount keys for registering the amounts to be entered, a plurality of longitudinally moving rack members, a structure for supporting said rack members, means associated with said amount keys for moving said rack members, springs associated with said rack members and deflected by the movement thereof, each rack member being associated with a different spring, means for holding said rack members in the positions to which they have been moved, means associated with said amount keys for causing transverse movement of said supporting structure, a spring deflected by said transverse movement of said supporting structure, means for holding said supporting structure in the position to which it has been moved, a plurality of numeral bearing wheels each having a pinion as an integral part thereof, a first means for associating said pinions with said rack members, a second means for associating said pinions with said rack members, means for releasing the holding means associated with said rack members so that the deflected springs can move them in a direction opposite to the direction of their first movement, thereby causing said numeral bearing wheels to rotate for adding when their pinions are associated with the rack members by the aforesaid first means, means for disassociating said pinions from said rack members and means for releasing said second holding means so that the spring associated with said supporting structure can return the supporting structure to its original position.

13. A computing machine as described in claim 12, wherein is included a depressible adding key, said adding key causing the association of said pinions with said longitudinally moving rack members by the aforesaid first means, the disassociation thereof and the releasing of both of the aforesaid holding means.

14. A computing machine as described in claim 13, wherein is included a depressible key which causes the releasing of both of said holding means without causing the association of said pinions with said longitudinally moving rack members.

15. A computing machine for both adding and subtracting including depressible amount keys for registering the amounts to be entered, a plurality of longitudinally moving rack members, a structure for supporting said rack members, means associated with said amount keys for moving said rack members, springs associated with said rack members and deflected by the movement thereof, each rack member being associated with a different spring, means for holding said rack members in the positions to which they have been moved, means associated with said amount keys for causing transverse movement of said supporting structure, a spring deflected by said transverse movement of said supporting structure, means for holding said supporting structure in the position to which it has been moved, a plurality of numeral bearing wheels each having a pinion as an integral part thereof, a first means for associating said pinions with said rack members, a second means for associating said pinions with said rack members, means for releasing the holding means associated with said rack members so that the deflected springs can move them in a direction opposite to the direction of their first movement, thereby causing said numeral bearing wheels to rotate for subtracting when their pinions are associated with said rack members by the aforesaid second means, means for disassociating said pinion from said rack members and means for releasing said second holding means so that the spring associated with said supporting structure can return the supporting structure to its original position.

16. A computing machine as described in claim 15, wherein is included a depressible subtracting key, said subtracting key causing the association of said pinions with said longitudinally moving rack members by the aforesaid second means, the disassociation thereof and the releasing of both of the aforesaid holding means.

17. An adding machine including a single set of ten depressible keys for registering the amounts to be added, a plurality of numeral bearing wheels, actuating means for rotating said numeral bearing wheels, and means actuated by said keys to cause energy to be stored in said actuating means, said energy being utilized, after said depressible keys have returned to their upper positions, to rotate said numeral bearing wheels.

18. A computing machine for both adding and subtracting including a plurality of rack members each having a first rack and a second rack, a plurality of gears, a different one of which is constantly in mesh with each such second rack, a plurality of numeral bearing wheels, each having a pinion and a cam as integral parts thereof, a plurality of detents associated with said rack members in such manner as to limit the motion of said rack members in one direction, each detent limiting the movement of a different rack member, a plurality of springs associated with said rack members, each rack member being associated with a different spring, which spring tends to move that rack member as far as its detent will permit, means for moving said rack members in a direction opposite to the direction limited by said detents, the amount of movement of the various rack members depending upon the amount to be added or subtracted, means for holding said rack members in the positions to which they have been moved, means for associating said pinions with said first racks on the rack members or said gears to cause rotation of said numeral bearing wheels in either direction, one direction for adding and the other direction for subtracting, when the rack members move toward the detents, means actuated by each of the said numeral bearing wheel cams, when the wheel of which it is a part passes between 0 and 9 in either direction for so moving the detent which engages the rack member associated with the numeral bearing wheel of the next higher order, that it will not limit the movement of the last said rack member but will allow it to travel the distance of one extra tooth space of the racks in the same direction, thereby causing the numeral bearing wheel of the next higher order to move one extra tooth space in the same direction.

19. In a computing machine for both adding and subtracting, transfer means including a rack member, a numeral bearing wheel having a pinion as an integral part thereof, a means for associating said pinion with said rack member so that movement of said rack member will cause rotation of said numeral bearing wheel in one direction for adding, a second means for associating said pinion with said rack member so that movement of said rack member will cause rotation of said numeral bearing wheel in the opposite direction for subtracting, means for limiting the movement of said rack member, a second numeral bearing wheel, and means actuating when said second numeral bearing wheel passes between 9 and 0 in either direction to remove said limiting means, thereby allowing the rack member to move an extra distance equivalent to the space of one tooth on the rack member, thereby causing the numeral bearing wheel to rotate one extra numeral.

20. An adding machine including racks which are moved into different positions depending upon the amount to be added, means for holding said racks in the positions to which they have been moved, numeral bearing wheels each having a pinion as an integral part thereof, means for associating said pinions with said racks, means for releasing the holding means, spring actuated means for returning the racks to their original positions, thereby rotating the numeral bearing wheels to cause adding thereon, means actuated by any numeral bearing wheel for causing the rack actuating the numeral bearing wheel of the next higher order to move one extra space to effect a transfer, means for disassociating said pinions from said racks, and a key actuated cam member which controls the movements of all of the above said means, so that the amount represented by the positions of the said racks will be added on the numeral bearing wheels, the said racks will be returned to their zero positions and all of the above said means will be restored to their original conditions.

21. An adding machine including racks, a plurality of keys for moving said racks into different positions depending upon the amount to be added, means for holding said racks in the positions to which they have been moved, numeral bearing wheels each having a pinion as an integral part thereof, means for subsequently associating said pinions with said racks, means for releasing said holding means, spring actuated means for returning said racks to their original positions, thereby rotating said numeral bearing wheels to cause adding thereon, means actuated by any numeral bearing wheel for causing the rack which actuates the wheel of the next higher order to move one extra space to effect a transfer, means for disassociating said pinions from said racks, an adding key, and a cam member which controls the movements of all of the above said means, so that the amount which is represented by the positions of said racks will be added on the said numeral bearing wheels, said racks will be returned to their original positions and all of the aforesaid means will be restored to their original conditions, said cam member being a longitudinally moving vertically disposed member which is actuated in one direction by the depressing of said adding key, and a spring associated therewith which returns said cam member to its original position.

22. An adding machine as described in claim 21, wherein the means for associating said pinions with said racks and the means for releasing the holding means are actuated during the movement of the cam member in one direction and the means for disassociating the pinions from the racks is actuated during the movement of the cam member in the other direction.

23. An adding machine as described in claim 22, wherein are included means to prevent movement of said cam member in said second direction until all rotation of the numeral bearing wheels which is required for adding and for effecting transfers has been completed.

24. An adding machine including a longitudinally moving cam member which controls the operations required to cause adding through its movement, a depressible key for moving said cam member in one direction, and a spring which is deflected by said movement of said cam member in one direction and which causes the movement of said cam member in the opposite direction.

25. In an adding machine including a plurality of numeral bearing wheels which are rotated for adding, each of which wheels has a pinion and a cam as integral parts thereof, means for resetting said wheels to zero which include longitudinally moving racks, each of said racks having a spring associated therewith, means for moving said racks in one direction, thereby deflecting said springs, means for holding said racks in the position to which they have been moved, means for associating said pinions with said racks, means for releasing said holding means so that the racks can be moved by said springs in a direction opposite to that in which they were first moved, means associated with said wheel cams to stop the rotation of each of said numeral bearing wheels when it reaches 0, means for locking said numeral bearing wheels when they have all reached zero, means for disassociating said pinions from said racks after said wheels are locked, thereby allowing said racks to be moved by the springs into their original positions, a vertically disposed longitudinally moving cam member which controls the movements of all of the aforesaid means which are used for returning said adding wheels to zero, a spring associated with said cam member, and a depressible key which causes movement of said cam member in one direction when it is depressed, thereby deflecting said spring, said spring causing movement of the cam member in the opposite direction, thereby causing the depressed key to rise.

26. An adding machine as described in claim 25, wherein some of the aforesaid means used for clearing are actuated during the depressing of said key, which causes longitudinal movement of said cam member in one direction, and some of the aforesaid means used for clearing are actuated while the cam member is moving in the opposite direction and the key is rising.

27. An adding machine as described in claim 25, wherein some of the means used for clearing are actuated during the depressing of said key, which causes longitudinal movement of said cam member in one direction, and some of said means used for clearing are actuated while said cam member is being moved in the opposite direction by said spring, the means actuated during the movement of the cam member in the first direction including said means for moving said racks in one direction, said means for holding said racks in the position to which they have been moved, said means for associating said pinions with said racks and said means for releasing said holding means so that the racks can be moved by said springs in a direction opposite to that in which they were first moved, means not actuated by the movement of said cam member including means for maintaining the association of said pinions with said racks until all of said wheels have rotated to their zero positions and have been stopped in said zero positions, after which said means for disassociating said pinions from said racks causes such disassociation, and means for preventing movement of said cam member in said opposite direction until said disassociation takes place.

28. In an adding machine including a plurality of wheels which are rotated for adding, each of which wheels has a pinion and a cam as integral parts thereof, means for resetting said wheels to zero including a cam member which moves longitudinally in one direction and then moves longitudinally in the opposite direction, longitudinally moving racks, each of said racks having a spring associated therewith, means for moving said racks in one direction, thereby deflecting said springs, means for holding said racks in the positions to which they have been moved, means for associating said pinions with said racks, means for releasing said holding means so that said racks can be moved by said springs in a direction opposite to that in which said racks were first moved, means associated with said wheel cams to stop the rotation of each of said wheels when it reaches zero, means for locking said wheels when they all have reached zero, and means for disassociating said pinions from said racks after said wheels are locked, thereby allowing said racks to be moved by said springs into their original positions, said cam member when moving longitudinally in its first direction actuating said means for moving said racks in the first direction, said holding means, said associating means and said releasing means.

29. In a computing machine for both adding and subtracting, including a plurality of wheels, each of which wheels has a pinion and a cam as integral parts thereof, means for rotating said wheels in one direction for adding, means for rotating said wheels in the opposite direction for subtracting, transfer means including a plurality of rotatably mounted cam engaging members, each of which engages one of said cams and is actuated by said cam for causing a transfer when the wheel of which said cam is a part passes between 9 and 0 in either direction, clearing means including means for rotating said wheels in the same direction as when subtracting and means whereby each of said cam engaging members engages a cam and arrests the movement of the wheel of which said cam is an integral part when that wheel reaches its zero position, and means for limiting the rotation of said cam engaging members within certain limits during adding so that transfer can be effected and within certain other limits during clearing so that the rotation of said wheels will be arrested by said cam engaging members when each such wheel reaches zero.

30. An adding machine including a plurality of numeral bearing wheels, a plurality of keys for registering amounts to be added, a + key to be used when adding, a − key to be used when subtracting, a plurality of rack members and a supporting structure therefor, means associated with said keys for moving said racks and said supporting structure, means associated with said racks for causing the rotation of said wheels for adding, and means for returning said rack members and said supporting structure to their original positions, wherein the depressing of each of said keys provides a portion of the energy required for actuating various of the above said means, and all of the energy required for actuating all of the above said means is provided by the depressing of said keys.

31. An adding machine as described in claim 30, including means to require complete depression of said keys before said keys can return to their upper positions.

32. In an adding machine, a plurality of numeral bearing wheels, a plurality of racks which cause rotation of said numeral bearing wheels, a structure for supporting said racks, a spring associated with said supporting structure, means for moving said supporting structure in one direction, thereby deflecting said spring, means for holding said supporting structure in the position to which it has been moved, means for releasing said holding means so said spring can return said supporting structure to its original position, and means for holding said releasing means in its releasing position until said supporting structure has returned to its original position.

33. In an adding machine, a plurality of numeral bearing wheels, a group of racks which cause rotation of said numeral bearing wheels for adding, a second group of racks which cause rotation of said numeral bearing wheels for returning said wheels to zero, a structure which supports both of the aforesaid groups of racks, means for moving said supporting structure into such positions that said first group of racks is in the proper position to cause rotation of said wheels for adding, means for moving said supporting structure into the position where the second group of racks is in the proper position for returning said wheels to zero, means including said second group of racks for returning said numeral bearing wheels to zero, and means for preventing the operation of the last said means unless said supporting structure is in the last said position.

34. An adding machine including a plurality of numeral bearing wheels, a group of racks whose movements cause rotation of said numeral bearing wheels and which effect transfers by moving an extra distance, means for returning such of said racks which have moved said extra distance to effect transfers to such positions as said racks would occupy if they had not effected transfers, a second group of racks which move to rotate said numeral bearing wheels to zero, means for actuating said second group of racks to one extreme of their travel, means for associating said numeral bearing wheels with said second group of racks and means for moving said second group of racks in order to cause said numeral bearing wheels to rotate to zero, said returning means and said actuating means including a common member which engages said first group of racks during adding operations and said second group of racks during zeroizing operations.

35. An adding machine including a plurality of depressible amount keys, a plurality of longitudinally moving rack members actuated by said amount keys, a transversely moving structure for supporting said rack members, a transversely sliding member, a spring associated with said transversely sliding member and with said supporting structure, an escapement mechanism, means for actuating said transversely sliding member so as to deflect said spring during the early part of the downward stroke of any one of said amount keys and means for actuating said escapement mechanism during the last part of the downward stroke of said amount key so as to allow said spring to transversely move said supporting structure.

36. An adding machine as described in claim 35 wherein all of the energy required for actuating said transversely sliding member and said escapement is provided by the depressing of said amount keys.

37. An adding machine including a plurality of depressible amount keys, a plurality of longitudinally moving rack members successively actuated by said amount keys, a transversely moving structure for supporting said rack members, a spring actuated by said amount keys for transversely actuating said supporting structure in one direction, a second spring in which energy is stored by said actuation of the supporting structure in said one direction for returning said supporting structure to its original position and means for releasing said stored energy so that said second spring can return said supporting member to its original position.

38. An adding machine as described in claim 37 including a transversely sliding member actuated by said amount keys for deflecting the first spring.

39. An adding machine including a plurality of longitudinally movable racks and a plurality of numeral bearing wheels, each of which wheels has a pinion as an integral part thereof, means for moving said racks various distances depending upon the number to be added, means for causing said pinions to be associated with said racks, means for moving said racks in the opposite direction from the direction of their first movement, during which latter movement said numeral bearing wheels are rotated by the movement of said racks by various amounts depending upon the distance that said racks associated therewith were originally moved, means for disassociating said pinions from said racks, and means for preventing such disassociation before all of said racks have returned to their original positions.

40. A computing machine for both adding and subtracting including a plurality of depressible keys for registering the amount to be entered, a longitudinally moving rack member which is moved by the depressing of said keys, each of said keys when depressed causing a different amount of movement of said rack member, said rack member including a first rack along one edge thereof and a second rack, a gear constantly in mesh with said second rack and positioned parallel to said rack member in such location that certain teeth thereon are aligned with certain teeth of said first rack, a numeral bearing wheel having a pinion as an integral part thereof and being rotatable about a fixed axis, an idler gear constantly in mesh with said pinion, said idler gear and said pinion having two positions, when in one position adding and when in the other position subtracting the amount entered, a depressible key which through suitable mechanical means, causes said idler gear to mesh with said first rack, thereby causing rotation of the numeral bearing wheel in one direction for adding and a second depressible key which causes said idler gear and numeral bearing wheel to move longitudinally along their axes so that depression simultaneously of both said depressible keys causes said idler gear to mesh with said gear which is constantly in mesh with said rack, thereby causing rotation of the numeral bearing wheel in the opposite direction for subtracting.

41. In an adding machine including a plurality of numeral bearing wheels which are rotated for adding, each of which wheels has a pinion and a cam as integral parts thereof, means for resetting said wheels to zero which include longitudinally moving racks, each of said racks having a spring associated therewith, means for moving said racks in one direction, thereby deflecting said springs, means for holding said racks in the position to which they have been moved, means for associating said pinions with said racks, means for releasing said holding means so that the racks can be moved by said springs in a direction opposite to that in which they were first moved, means associated with said wheel cams to stop the rotation of each of said numeral bearing wheels when it reaches 0, means for locking said numeral bearing wheels when they have all reached zero, means for disassociating said pinions from said racks after said wheels are locked, thereby allowing said racks to be moved by the springs into their original positions and means for preventing the disassociation of said pinions from said racks until all of said wheels have rotated into their zero positions and the rotation of all of said wheels has been stopped.

42. In an adding machine including a plurality of numeral bearing wheels which are rotated for adding, each of which wheels has a pinion and a cam as integral parts thereof, means for resetting said wheels to zero which include longitudinally moving racks, each of said racks having a spring associated therewith, means for moving said racks in one direction, thereby deflecting said springs, means for holding said racks in the position to which they have been moved, means for associating said pinions with said racks, means for releasing said holding means so that the racks can be moved by said springs in a direction opposite to that in which they were first moved, means associated with said wheel cams to stop the rotation of each of said numeral bearing wheels when it reaches 0, means for locking said numeral bearing wheels when they have all reached zero, means for disassociating said pinions from said racks after said wheels are locked, thereby allowing said racks to be moved by the springs into their original positions, a cam member which actuates some of the aforesaid means which are used in returning said adding wheels to zero while said cam member is moving in one direction and which actuates other of the aforesaid means while said cam member is moving in the opposite direction, and means for preventing movement of said cam member in said opposite direction until said cam member has moved sufficiently in said first direction to actuate all of said means which said cam member will actuate if moved in said first direction to the full extent of its travel.

43. An adding machine including a plurality of depressible amount keys, a plurality of longitudinally moving rack members, a structure for supporting said rack members, a rack actuating member associated with said depressible keys so as to be moved thereby, a second actuating member associated with said depressible keys so as to be moved thereby, said rack actuating member being moved a different distance by the depressing of each different amount key, said second actuating member being moved the same distance by the depressing of any of said keys, means associated with said rack actuating member for moving said rack members and means associated with said second actuating member to cause transverse movement of said supporting structure, the last said means including a transversely sliding member moved by said second actuating member each time any one of said amount keys is depressed, and a spring disposed between said supporting structure and said transversely sliding member, said transversely sliding member deflecting the spring which in turn causes the transverse movement of said supporting structure.

44. An adding machine including a plurality of depressible amount keys, a plurality of longitudinally moving rack members, a structure for supporting said rack members, a rack actuating member associated with said depressible keys so as to be moved thereby, a second actuating member associated with said depressible keys so as to be moved thereby, said rack actuating member being moved a different distance by the depressing of each different amount key, said second actuating member being moved the same distance by the depressing of any of said keys, means associated with said rack actuating member for moving said rack members, means associated with said second actuating member to cause transverse movement of said supporting structure, an escapement mechanism and a transversely sliding member, both of which are actuated by said second actuating member each time any one of said amount keys is depressed, and a spring disposed between said supporting structure and said transversely sliding member, which spring is deflected by said sliding member, thereby providing all the energy required for causing the transverse movement of said supporting structure when escapement mechanism is actuated.

45. An adding machine including a plurality of depressible amount keys, a plurality of longitudinally moving rack members, a structure for supporting said rack members, a rack actuating member associated with said depressible keys so as to be moved thereby, a second actuating member associated with said depressible keys so as to be moved thereby, said rack actuating member being moved a different distance by the depressing of each different key, said second actuating member being moved the same distance by the depressing of any of said keys, means associated with said rack actuating member for moving said rack members, means associated with said second actuating member to cause transverse movement of said supporting structure, a spring for transversely actuating said supporting structure in one direction, a transversely sliding member actuated by said second actuating member for deflecting said spring, an escapement mechanism actuated by said second actuating member for controlling the transverse movement of said supporting member and a second spring deflected by the above described transverse movement of said supporting structure to return said supporting structure to its original position.

46. An adding machine including a plurality of depressible amount keys, an adding key, a plurality of longitudinally moving rack members actuated by said amount keys, a transversely moving structure for supporting said rack members, means actuated by said amount keys for storing energy to be used in moving said supporting member in one direction, means actuated by said amount keys for causing the delayed release of said stored energy, thereby causing said supporting member to move in said one direction, at the same time storing energy to be used for returning said supporting member to its original position, and means actuated by said adding key for releasing this latter stored energy, thereby causing the supporting member to return to its original position.

47. An adding machine including a plurality of rack members, a plurality of numeral bearing wheels, each having a pinion and a cam as integral parts thereof, means for moving each of said rack members longitudinally in one direction varying amounts according to the amounts to be added, means for interconnecting said pinions with said rack members, each pinion being interconnected with a single rack member in such manner that longitudinal movement of a rack member in a direction opposite to the first direction causes rotation of a wheel for adding, means for moving said racks in said opposite direction, means for disconnecting said pinions from said rack members, and means for preventing said disconnecting before all of said rack members have returned to their original positions.

48. An adding machine including a plurality of rack members, a plurality of numeral bearing wheels, each having a pinion and a cam as integral parts thereof, means for moving each of said rack members longitudinally in one direction varying amounts according to the amounts to be added, means including a cam member for interconnecting said pinions with said rack members when said cam member is moved from a first position to a second position, each pinion being interconnected with a single rack member in such manner that longitudinal movement of a rack member in a direction opposite to the first direction causes rotation of a wheel for adding, means for moving said rack members in said opposite direction, means for returning said cam member to its first position, thereby causing disconnection of said pinions from said rack members, and means for preventing the return of said cam member to its first position before all of said rack members have returned to their original positions.

49. An adding machine as described in claim 48, including a key which, when depressed, moves said cam member from its first position to its second position and which will remain depressed until said cam member returns to its first position.

50. An adding machine as described in claim 49, in which said means for moving each of said rack members in one direction includes a plurality of depressible amount keys, each of which moves said rack members a different distance, and means for preventing the depressing of any of said amount keys when said cam member is not in its first position.

51. An adding machine as described in claim 49, in which said means for moving each of said rack members in one direction includes a plurality of depressible amount keys, each of which moves said rack members a different distance, and means for preventing the depressing of said cam member operating key when any of said amount keys is depressed.

52. A computing machine for both adding and subtracting including a plurality of rack members each having a first rack and a second rack, a plurality of gears constantly in mesh with said second racks, each gear being in mesh with one of said second racks, means for moving said rack members longitudinally in one direction varying amounts according to the amounts to be added or subtracted, a plurality of numeral bearing wheels, each having a pinion and a cam as integral parts thereof, means for interconnecting said pinions with said first racks of said rack members, each pinion being interconnected with a single rack member in such manner that movement of a rack member causes rotation of a wheel in one direction for adding, means for interconnecting said pinions with said gears, each pinion being interconnected with a single gear, so that longitudinal movement of a rack member causes rotation of a wheel in the direction opposite to the first direction for subtracting, the direction of movement of the rack member being opposite to its first direction whether adding or subtracting, means for moving said rack members in said opposite direction, means for disconnecting said pinions from said rack members, and means for preventing said disconnection before all of said rack members have returned to their original positions.

53. A computing machine for both adding and subtracting including a plurality of rack members each having a first rack and a second rack, a plurality of gears constantly in mesh with said second racks, each gear being in mesh with one of said second racks, means for moving each of said rack members longitudinally in one direction varying amounts according to the amounts to be added or subtracted, a plurality of numeral bearing wheels, each having a pinion and a cam as integral parts thereof, means including a cam member for interconnecting said pinions with said rack members when said cam member is moved from a first position to a second position, each pinion being interconnected with a single rack member in such manner that movement of a rack member causes rotation of a wheel in one direction for adding, means for interconnecting said pinions with said gears, each pinion being interconnected with a single gear, so that longitudinal movement of a rack member causes rotation of a wheel in a direction opposite to the first direction for subtracting, the direction of movement of the rack member being opposite to its first direction whether adding or subtracting, means for moving said rack members in said opposite direction, means for returning said cam member to its first position, thereby causing disconnection of said pinions from said rack members, and means for preventing the return of said cam member to its first position before all of said rack members have returned to their original positions.

54. A computing machine as described in claim 53, including a key which when depressed moves said cam member from its first position to its second position and which will remain depressed until said cam member returns to its first position.

55. A computing machine as described in claim 54, in which said means for moving each of said rack members in one direction includes a plurality of depressible amount keys, each of which moves said rack members a different distance, and means for preventing the depression of any of said amount keys when said cam member is not in its first position.

56. A computing machine as described in claim 54, in which said means for moving each of said rack members in one direction includes a plurality of depressible amount keys, each of which moves said rack members a different distance, and means for preventing the depressing of said cam member operating key when any of said amount keys is depressed.

57. An adding machine including a single set of ten depressible keys for registering amounts to be added, a plurality of numeral bearing wheels, actuating means for rotating said numeral bearing wheels, means actuated by said keys to cause energy to be stored in said actuating means, means to cause said energy to be utilized to rotate said numeral bearing wheels, and means to release said stored energy without rotating said numeral bearing wheels.

58. An adding machine as described in claim 57, wherein the last means also returns the actuating means to its original position.

59. An adding machine including a single set of ten depressible keys, a plurality of longitudinally moving racks and a plurality of numeral bearing wheels for registering totals, each of which wheels has a pinion as an integral part thereof, means associated with said set of keys for successively and positively causing the longitudinal movement of the racks as said keys are depressed, the racks being moved a different distance by each key, means by which said pinions are subsequently associated with said racks, means for moving said racks in the opposite direction from the direction of the first movement, during which latter movement the numeral bearing wheels are rotated various amounts by the movement of the racks, the amount of rotation of the wheels depending upon the amount of movement of the racks, means for preventing disassociation of the gears from the racks before all of said racks have returned to their original positions.

60. An adding machine including a single set of ten depressible keys, a plurality of longitudinally moving racks and a plurality of numeral bearing wheels for registering totals, each of which wheels contains equally spaced numerals from 0 to 9 and has a pinion as an integral part thereof, means associated with said set of keys for successively and positively causing the longitudinal movement of the racks as said keys are depressed, the racks being moved a different distance by each key, means by which said pinions are subsequently associated with the racks, means for moving said racks in the opposite direction from the direction of their first movement, during which latter movement the numeral bearing wheels are rotated various amounts by the movement of the racks, the amount of the rotation of the wheels depending upon the amount of movement of the racks, means such that when any of said wheels passes from 9 to 0, the rack associated with the wheel of the next higher order will be cause to move one tooth space beyond its original position in order to effect a transfer, means for disassociating the gears from the racks, and means to prevent said disassociation of the gears from the racks before all such transfers have been completed.

61. An adding machine including a single set of ten depressible keys, a plurality of longitudinally moving racks and a plurality of numeral bearing wheels for registering totals, each of which wheels contains equally spaced numerals from 0 to 9 and has a pinion as an integral part thereof, means associated with said set of keys for successively and positively causing the longitudinal movement of the racks as the keys are depressed, the racks being moved a different distance by each key, means by which said pinions are subsequently associated with the racks, means for moving said racks in the opposite direction from the direction of the first movement, during which latter movement the numeral bearing wheels are rotated various amounts by the movement of the racks, the amount of rotation of the wheels depending upon the amount of movement of the racks, means for disassociating the gears from the racks, a plurality of detents, one of said detents being associated with each of said racks, which detent limits the movement of its associated rack in the opposite direction from its first movement, means actuated when any of said wheels passes from 9 to 0 to move the detent associated with the rack of the next higher order so that this rack can move one extra tooth space in said opposite direction in order to effect a transfer, means to prevent said disassociation of the wheels from the racks before those racks whose travel is limited by the detents have returned to their original positions, and means to prevent said disassociation of the wheels from the racks until all of those racks whose detents have been moved so as to allow said extra movement of the racks have moved the extra tooth space necessary to effect the transfer.

62. An adding machine including a single set of ten depressible keys, a plurality of longitudinally moving racks and a plurality of numeral bearing wheels for registering totals, each of which wheels contains equally spaced numerals from 0 to 9 and has a pinion as an integral part thereof, means associated with said set of keys for successively and positively causing the longitudinal movement of the racks as said keys are depressed, the racks being moved a different distance by each key, means by which said pinions are subsequently associated with said racks, means for moving said racks in the opposite direction from the direction of their first movement, during which latter movement the numeral bearing wheels are rotated various amounts by the movement of the racks, the amount of rotation of the wheels depending upon the amount of movement of the racks, means for disassociating the gears from the racks, a detent associated with each of said racks, which detent when in one position limits the movement of its associated rack in the opposite direction from its first movement and when in its second position allows said associated rack to travel one extra tooth space in said opposite direction, thereby effecting a transfer, means actuated by the passing of any of said wheels from 9 to 0 to move the detent associated with the rack of the next higher order from its first position to its second position, means for moving said detent into a third position when its associated rack moves said distance of one extra tooth space in said opposite direction, and means for preventing the disassociation of said wheels from said racks when any of said detents is in its second position.

63. A computing machine for both adding and subtracting including a plurality of longitudinally moving rack members, each having a first rack and a second rack, a plurality of gears constantly in mesh with said second racks, each gear being meshed with one of said second racks, a plurality of numeral bearing wheels, means for associating said numeral bearing wheels with said first racks on said first rack members so that movement of the rack member causes rotation of said wheels in one direction for adding, a means associating said numeral bearing wheels with said gears so that movement of the rack members causes rotation of said wheels in the opposite direction for subtracting, a plurality of detents engaging said rack members, each detent engaging a different member so as to limit the movements of said rack members, means associated with said numeral bearing wheels for disengaging said detents from said rack members, thereby allowing said rack members to move sufficiently farther in the same direction to cause the numeral bearing wheels to rotate one extra numeral in the direction in which it was previously being rotated and means for preventing the disassociation of said numeral bearing wheels from said racks until all rotation of said numeral bearing wheels which is required for adding or subtracting and for effecting transfers has been completed.

References Cited in the file of this patent

UNITED STATES PATENTS

| | | |
|---|---|---|
| 605,909 | Peters | June 21, 1898 |
| 627,403 | Fauvel et al. | June 20, 1899 |
| 1,038,774 | Manny | Sept. 17, 1912 |
| 1,049,057 | Dalton et al. | Dec. 21, 1912 |
| 1,080,907 | Gatewood et al. | Dec. 9, 1913 |
| 1,309,897 | Lasker | July 15, 1919 |
| 1,318,798 | Quentell | Oct. 14, 1919 |
| 1,364,624 | Enders | Jan. 4, 1921 |
| 1,371,138 | Bair | Mar. 8, 1921 |
| 1,458,642 | Collins | June 12, 1923 |
| 1,624,105 | Landsiedel | Apr. 12, 1927 |
| 1,707,094 | Puttemans et al. | Mar. 26, 1929 |
| 1,826,291 | Strother | Oct. 6, 1931 |
| 1,835,170 | Mehan | Dec. 8, 1931 |
| 1,862,072 | Wittum | June 7, 1932 |
| 1,878,125 | Fuller | Sept. 20, 1932 |
| 1,895,848 | Gubelmann | Jan. 31, 1933 |
| 1,934,747 | Sundstrand | Nov. 14, 1933 |
| 2,014,561 | Dysart | Sept. 17, 1935 |
| 2,034,345 | Kottmann | Mar. 17, 1936 |
| 2,035,715 | Pearson et al. | Mar. 31, 1936 |
| 2,048,541 | Dreher | July 21, 1936 |
| 2,079,423 | Rast | May 4, 1937 |
| 2,152,320 | Llorens | Mar. 28, 1939 |
| 2,204,239 | Swanson | June 11, 1940 |
| 2,228,165 | Haegele et al. | Jan. 7, 1941 |
| 2,261,115 | Hofgaard | Nov. 4, 1941 |
| 2,285,353 | Peirce | June 2, 1942 |
| 2,356,714 | Webb | Aug. 22, 1944 |
| 2,590,345 | Reppert | Mar. 25, 1952 |
| 2,615,633 | Furman et al. | Oct. 28, 1952 |
| 2,681,765 | Hopkins et al. | June 22, 1954 |